United States Patent
Komasaka et al.

(10) Patent No.: US 6,594,781 B1
(45) Date of Patent: Jul. 15, 2003

(54) METHOD OF RESTORING MEMORY TO A PREVIOUS STATE BY STORING PREVIOUS DATA WHENEVER NEW DATA IS STORED

(75) Inventors: Toshio Komasaka, Tokushima (JP); Chikayasu Bando, Tokushima (JP); Masato Yasutomi, Tokushima (JP); Takashi Miyamoto, Tokushima (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/496,332

(22) Filed: Feb. 2, 2000

(30) Foreign Application Priority Data

Mar. 31, 1999 (JP) .......................................... 11-094056

(51) Int. Cl.[7] .................................................. G06F 11/00
(52) U.S. Cl. ............................................ 714/19; 714/15
(58) Field of Search ............................ 714/2, 6, 15, 19, 714/20

(56) References Cited

U.S. PATENT DOCUMENTS

| 5,089,958 | A | * | 2/1992 | Horton et al. ................. 714/5 |
| 5,263,154 | A | * | 11/1993 | Eastridge et al. ............. 714/6 |
| 5,325,519 | A | * | 6/1994 | Long et al. .................... 714/15 |
| 5,487,160 | A | * | 1/1996 | Bemis ........................ 711/114 |
| 5,638,509 | A | * | 6/1997 | Dunphy et al. ............... 714/20 |
| 5,704,031 | A | | 12/1997 | Mikami et al. |
| 5,922,072 | A | | 7/1999 | Hutchison et al. |
| 5,958,062 | A | | 9/1999 | Komasaka et al. |
| 5,974,425 | A | * | 10/1999 | Obermarck et al. ......... 707/202 |
| 6,016,553 | A | * | 1/2000 | Schneider et al. ............ 714/21 |
| 6,141,773 | A | * | 10/2000 | St. Pierre et al. ........... 711/162 |
| 6,185,577 | B1 | * | 2/2001 | Nainani et al. ............. 707/201 |
| 6,286,113 | B1 | * | 9/2001 | Sembach et al. ............. 714/15 |

FOREIGN PATENT DOCUMENTS

| GB | 2 294 568 A | 1/1996 | .......... G06F/12/00 |
| JP | 8-272643 | 10/1996 | |
| JP | 10-260859 | 9/1998 | |
| JP | 10-260860 | 9/1998 | |
| JP | 11-265300 | 9/1999 | |
| JP | 11-265301 | 9/1999 | |

* cited by examiner

Primary Examiner—Robert Beausoliel
Assistant Examiner—Gabriel Chu
(74) Attorney, Agent, or Firm—Staas & Halsey LLP

(57) ABSTRACT

A computer comprises a write monitor unit for monitoring a data write operation into an operating system file, an update data file for storing update data upon detection of a data write operation, an update-log file for storing the history information for the update data in the case where the update data is stored, and a read monitor unit for reading data from the update data file in the case where the history information for the data to be read from the operating system file is stored and reading data from the operating system file in the case where the history information is not stored.

12 Claims, 18 Drawing Sheets

FIG. 3A

| No. | DATA NAME | UPDATE TIME |
|---|---|---|
| 1 | A | 1999,01,12,0100 |
| 2 | B | 1999,01,12,0130 |
| 3 | C | 1999,01,12,0131 |
| 4 | A | 1999,01,12,0200 |
| 5 | | |

| No. | DATA NAME | UPDATE TIME |
|---|---|---|
| 1 | A | 1999,01,12,0100 |
| 2 | B | 1999,01,12,0130 |
| 3 | | |
| 4 | | |
| 5 | | |

25

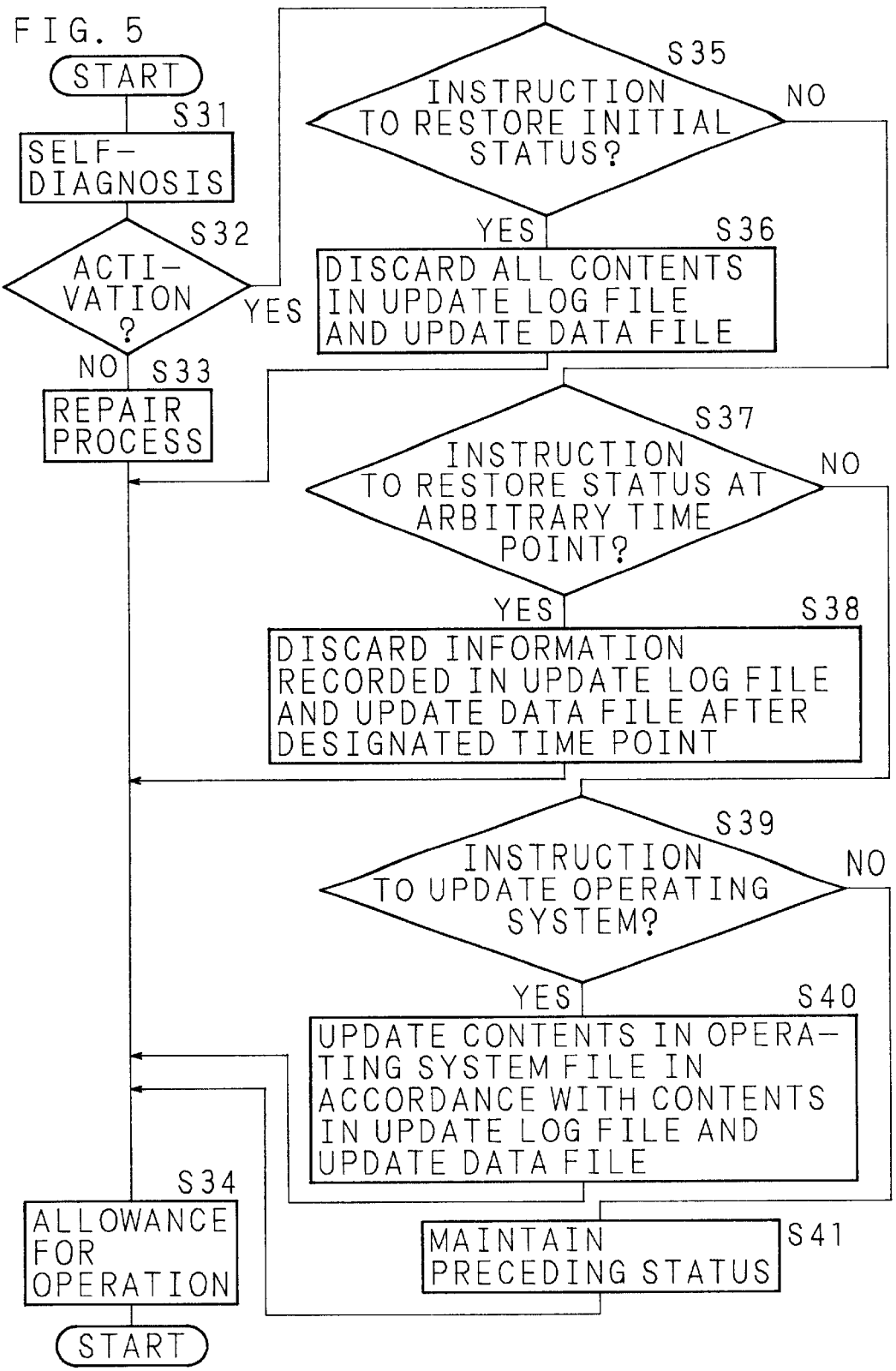

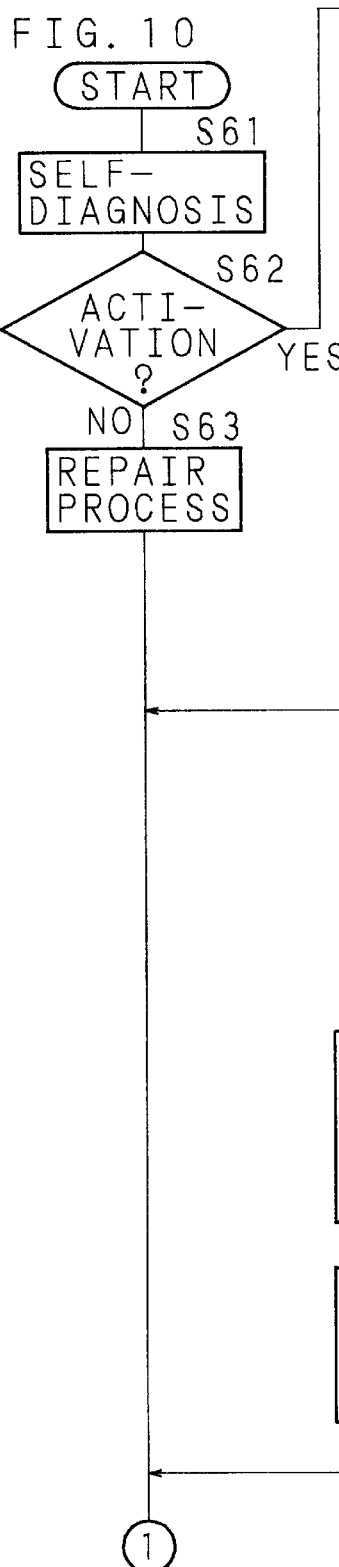

FIG. 17

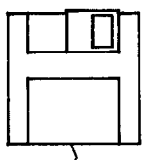

205M

| PC11:MONITORING THAT STORED DATA IS REPLACED BY WRITING CORRESPONDING UPDATE DATA |
|---|
| PC12:STORING UPDATE DATA UPON DETECTION THAT UPDATE DATA IS WRITTEN |
| PC13:STORING HISTORY INFORMATION OF STORED UPDATE DATA |
| PC14:MONITORING READ OPERATION OF STORED DATA |
| PC15:WHEN EXECUTING STORED DATA READ OPERATION,READING CORRESPONDING UPDATE DATA IN THE CASE WHERE HISTORY INFORMATION FOR DATA TO BE READ IS STORED |
| PC16:WHEN EXECUTING STORED DATA READ OPERATION,READING CORRESPONDING NON-UPDATED DATA IN THE CASE WHERE HISTORY INFORMATION FOR DATA TO BE READ IS NOT STORED |
| PC17:DISCARDING STORED UPDATE DATA AND HISTORY INFORMATION IN RESPONSE TO AN INSTRUCTION TO RESTORE INITIAL STATUS OF STORED DATA |
| PC18:DISCARDING STORED HISTORY INFORMATION AFTER A DESIGNATED TIME POINT AND CORRESPONDING STORED UPDATE DATA IN RESPONSE TO AN INSTRUCTION TO RESTORE STATUS OF STORED DATA AT DESIGNATED TIME POINT |
| PC19:REPLACING NON-UPDATED DATA WITH CORRESPONDING STORED UPDATE DATA AND DISCARDING STORED UPDATE DATA AND HISTORY INFORMATION IN RESPONSE TO AN INSTRUCTION TO UPDATE STORED DATA |

FIG. 18

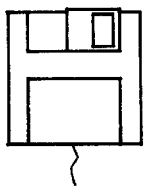
205M

PC21: MONITORING THAT STORED DATA IS REPLACED BY WRITING CORRESPONDING UPDATE DATA

PC22: STORING UPDATED DATA REPLACED BY UPDATE DATA UPON DETECTION THAT UPDATE DATA IS WRITTEN

PC23: STORING HISTORY INFORMATION OF STORED UPDATED DATA

PC24: REPLACING UPDATE DATA WITH STORED CORRESPONDING UPDATED DATA AND DISCARDING STORED UPDATED DATA AND HISTORY INFORMATION IN RESPONSE TO AN INSTRUCTION TO RESTORE INITIAL STATUS OF STORED DATA

PC25: REPLACING UPDATE DATA WITH CORRESPONDING UPDATED DATA STORED AFTER A DESIGNATED TIME POINT IN ACCORDANCE WITH STORED HISTORY INFORMATION AND DISCARDING UPDATED DATA AND CORRESPONDING HISTORY INFORMATION STORED AFTER DESIGNATED TIME POINT IN RESPONSE TO AN INSTRUCTION TO RESTORE STATUS OF STORED DATA AT DESIGNATED TIME POINT

PC26: DISCARDING STORED UPDATED DATA AND HISTORY INFORMATION IN RESPONSE TO AN INSTRUCTION TO UPDATE STORED DATA

METHOD OF RESTORING MEMORY TO A PREVIOUS STATE BY STORING PREVIOUS DATA WHENEVER NEW DATA IS STORED

The present invention relates to a computer, or more in particular to a computer capable of restoring an operating system to the status at an arbitrary past time point. Also, the present invention relates to a computer network system connected with a computer having the above-mentioned function and a recording medium having recorded therein a computer program for causing a multipurpose computer to have the above-mentioned function.

When writing the data used by the computer such as an OS (operating system), an application program file, or a data file, the operating system file storing the data (OS, application file, data file, etc.) is rewritten. In a subsequent data read operation, the corresponding data are read from the operating system file thus rewritten, and therefore the operating system file in the latest status is always used.

In a self-maintenance system of a computer, on the other hand, the contents of the operating system file described above are stored in a backup area as backup data. In the case where a fault is found in a given data by a self-diagnosis or in the case where the computer is infected by a virus, the faulty data is rewritten with the data stored in the backup area, thereby making immediate repair possible.

In recent years, with the improvement in personal computer performance, the use of the client/server system has extended. In the client/server system, an operating error by the user or a simple error in setting an environment is liable to develop a trouble affecting the whole network system. In such a case, the maintenance work itself becomes impossible or even a system down situation may occur before successful dissolution of the trouble. The chance of such adversity increases with the number of computers connected to the network, and therefore with the increase in the size of the network system, the resulting economic loss is not negligible. For a network system such as a client/sever system, therefore, as compared with a stand-alone computer used in an isolated situation, the self-maintenance assumes a greater importance.

Further, in a network system such as a client/server system comprising a plurality of computers used as clients and servers, the infection by a computer virus has recently posed a serious problem. Specifically, once any one of a plurality of computers making up a client/server system is infected with a computer virus, all the clients and servers are infected through the network, often leading to a serious loss. Thus, efficient system maintenance is crucial for graceful operation of a client/server system. This is also the case with a stand-alone computer.

In view of this situation, it is common practice to perform the backup work or specifically, the work of storing a copy of data (application file, data file, etc.) used by each computer in the form of backup data as part of the maintenance work of both individual computers of the client/server system and the stand-alone computers. The storage of the backup data and the execution of the self-maintenance permits each computer to be immediately repaired when some data becomes faulty or infected by a computer virus.

The hardware, OS, and the application software of the computer have recently increased in size and become complicated to such an extent that the time required for the self-maintenance has lengthened considerably. Further, in view of the increasing chance for organizations to use the computer for their business activities, using the above-mentioned self-maintenance in batch fashion by diagnosing the computer over the whole period from the starting point to the ending point of use thereof consumes a great amount of time and may cause a wasteful time consumption by the unnecessary diagnosis of parts requiring no repair.

BRIEF SUMMARY OF THE INVENTION

An object of the present invention is to provide a computer which can be restored to the status thereof at an arbitrary time point including the initial time point by monitoring the write operation of the hardware, firmware, and software.

Another object of the invention is to provide a computer network system connected with computers having the function described above.

Still another object of the invention is to provide a recording medium having recorded therein a computer program for causing a multipurpose computer to have the function described above.

In short, according to the present invention, there is provided a stand-alone computer or a computer connected to a computer network system, in which the operation of writing into an operating system file storing data of hardware, firmware or software is monitored, an d whenever a write operation is executed, the old data replaced by the write operation and the history thereof are stored so that the status at an arbitrary time point including the initial status can be restored based on the two types of data.

According to a first aspect of the invention, there is provided a computer, in which in the case where the data used for the operation of the computer is replaced by writing update data, the particular update data, the updated data replaced by the update data, and the non-updated data not yet replaced by the update data are all stored, and in response to an instruction to restore the initial status, the update data is discarded, while in response to an instruction to restore the status at a designated arbitrary time point, the update data stored after the designated time point is discarded, and in response to an instruction to update the data, the updated data is replaced by the corresponding update data. In this way, the status at an arbitrary time point including the initial status can be easily restored.

According to a second aspect of the invention, there is provided a computer, in which in the case where the data used for the operation of the computer is replaced by writing update data, the particular update data and the history information thereof are stored independently of the data to be replaced by the update data, and in response to an instruction to restore the initial status, the update data is discarded, while in response to an instruction to restore the status at a designated arbitrary time point, the update data stored after the designated time point is discarded with reference to the history information, and in response to an instruction to update the data, the non-updated data is replaced by the corresponding update data. In this way, the status at an arbitrary time point including the initial status can be easily restored.

According to a third aspect of the invention, there is provided a computer, in which, in the case where the data used for the operation of a computer is replaced by writing update data, the particular updated data and the history information thereof are stored independently of the update data. In response to an instruction to restore the initial status, the update data is replaced by the corresponding updated data, while in response to an instruction to restore the status at a designated arbitrary time point, the update data is replaced by the corresponding updated data stored after the designated time point with reference to the history information, and the history information after the designated time point and the corresponding updated data are discarded, and in response to update the data, the updated data and the history information thereof are discarded. As a result, the status at an arbitrary time point including the initial status can be easily restored.

According to a fourth aspect of the invention, there is provided a computer network system, in which, in the case where the data used for the operation of the computer to be monitored is replaced by writing the update data, the update data and the history information thereof are stored in a storage medium different from the storage medium for storing the data to be replaced by the update data. In response to an instruction to restore the initial status, the update data is discarded, while in response to an instruction to restore the status at a designated arbitrary time point, the update data stored after the designated time point is discarded with reference to the history information, and in response to an instruction to update the data, the non-updated data is replaced by the update data. As a result, the status of the computer to be monitored can be easily restored to the status at an arbitrary time point including the initial status.

According to a fifth aspect of the invention, there is provided a computer network system, in which, in the case where the data used for the operation of a computer to be monitored is replaced by writing update data, the updated data and the history information thereof are stored in a storage medium different from the storage medium for the update data, and in response to an instruction to restore the initial status, the update data is replaced by the corresponding updated data, while in response to an instruction to restore the status at a designated arbitrary time point, the update data is replaced by the updated data stored after the designated time point with reference to the history information, and the history information after the designated time point and the corresponding updated data are discarded. In response to an instruction to update the data, the updated data and the history information thereof are discarded. As a result, the status at an arbitrary time point including the initial status of a computer to be monitored can be easily restored.

According to sixth and seventh aspects of the invention, there is provided a recording medium having stored therein a computer program for performing the functions described above. In the case where the computer program recorded in the recording medium according to the sixth aspect of the invention is read by a multipurpose computer, the computer according to the second aspect of the invention described above is realized. Also, in the case where each program code constituting the computer program recorded in the recording medium according to the sixth aspect of the invention is read distributively by a plurality of multipurpose computers interconnected by a network system, the computer network system according to the fourth aspect of the invention described above is realized. In the case where the computer program recorded in the recording medium according to the seventh aspect of the invention is read by a multipurpose computer, on the other hand, the computer according to the third aspect of the invention described above is realized. Further, in the case where each program code constituting the computer program recorded in the recording medium according to the seventh aspect of the invention is read distributively by a plurality of multipurpose computers interconnected by a network system, the computer network system according to the fifth aspect of the invention described above is realized.

The above and further objects and features of the invention will more fully be apparent from the following detailed description with accompanying drawings.

BRIEF DESCRIPTION OF THE SEVERAL VIEWS OF THE DRAWINGS

FIGS. 3A, 3B are model diagrams showing the contents stored in an update log file of a computer according to the first embodiment of the invention.

FIG. 5 is a flowchart showing the operating steps for the maintenance of a computer according to the first embodiment of the invention.

FIG. 10 is a flowchart showing the operating steps for the maintenance of a computer according to the second embodiment of the invention.

FIG. 17 is a model diagram showing the contents of a computer program recorded in a recording medium according to the invention.

FIG. 18 is a model diagram showing the contents of a computer program recorded in a recording medium according to the invention.

DETAILED DESCRIPTION OF THE INVENTION

Figure 1:
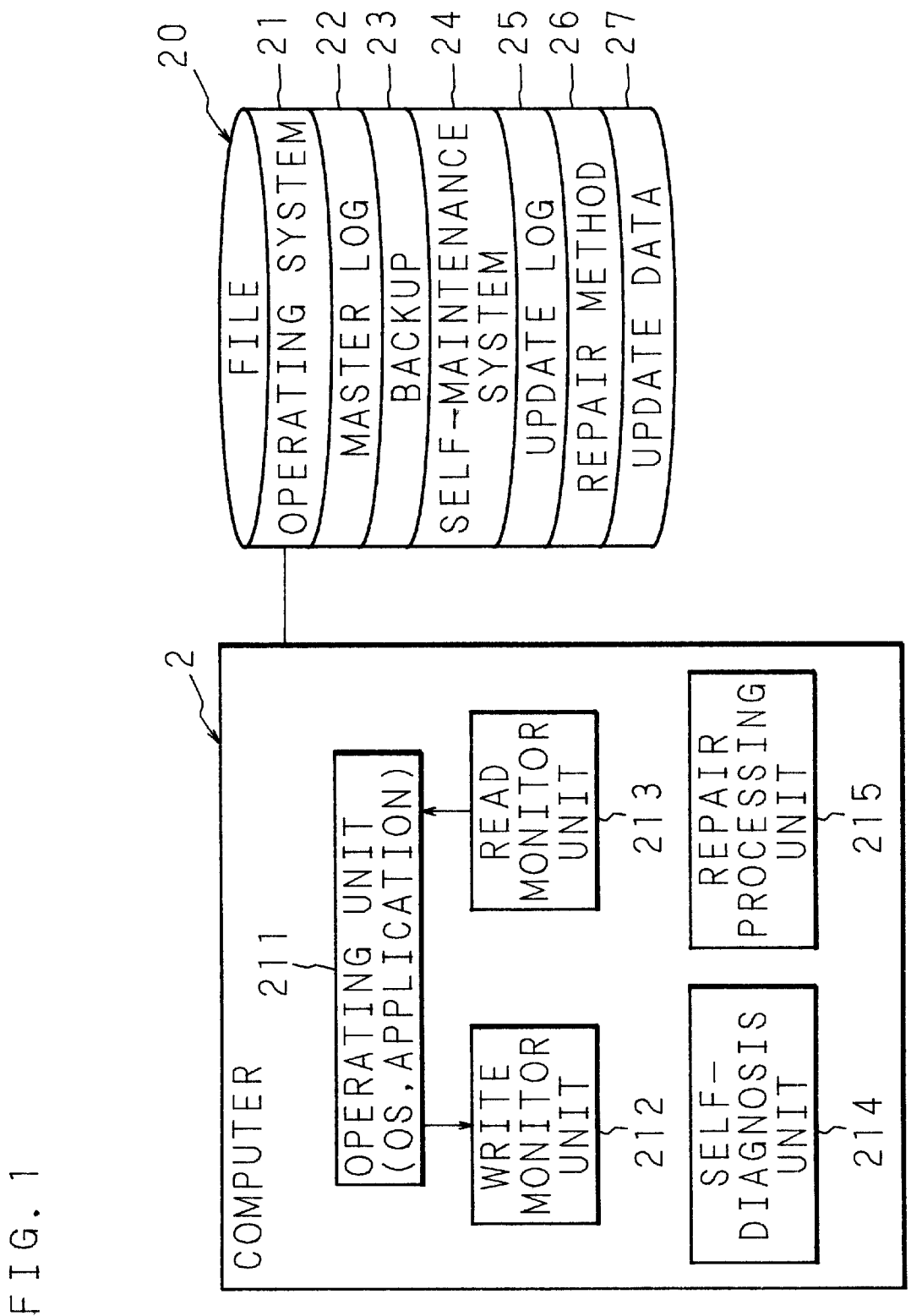
FIG. 1 is a model diagram showing an example configuration of a computer according to a first embodiment of the invention.

The present invention will be described in detail below with reference to the drawings showing embodiments thereof. FIG. 1 is a model diagram showing an example configuration of a computer according to the first embodiment of the invention.

In FIG. 1, reference numeral 2 designates a computer comprising hardware units including a CPU, a memory, a disk unit (a hard disk, a flexible disk, etc.), a printer, a display unit, a keyboard, and a mouse, thus constituting a multipurpose computer connected with a large capacity storage medium 20 using a hard disk, a magnetic tape, etc. This storage medium 20 is installed with an OS and various software components.

The storage medium 20 of the computer 2 has, stored therein, information in the form of files including an operating system file 21, a master log file 22, a backup file 23, a self-maintenance system file 24, an update log file 25, a repair method file 26 and an update data file 27, etc.

The operating system file 21 has, stored therein, an OS and various application software in the form of files required for normal operation of the computer 2. These software components, when executed by the computer 2, function as an operating unit 211, a write monitor unit 212, and a read monitor unit 213. Their functions are executed by way of the operating unit. In the case where the OS and the general application software, such as the word processor and the spreadsheet application, are stored in the operating system file 21, they are executed by the computer 2.

The master log file 22 holds the operation history of the computer 2 and is referred to at the time of self-maintenance. The backup file 23 has, stored therein, the backup data for the folder/file to be repaired at the time of self-maintenance of the computer 2 itself.

The self-maintenance system file 24 has, stored therein, various pieces of software in the form of files required for the self-maintenance of the computer, 2 itself. When these pieces of software are executed by the computer 2, they function as a self-diagnosis unit 214 and 'a repair processing unit 215.

The update log file 25 has, stored therein, the history of the data updated by the write operation as log information. The repair method file 26 has, stored therein, a method of repairing the operating system file 21, as described later. The update data file 27 has, written therein, the data to be newly written as update data at the time of the write operation. Specifically, in the computer according to the first embodiment of the invention, in general, the update data to be written in the operating system file 21 is written in the update data file 27 while the old data is held in the operating system file 21. By the way, the data not updated, i.e. the non-updated data is of course also held as it is in the operating system file 21.

Now, an explanation will be given of the internal functions of the computer 2 other than the operating unit 211, i.e., the functions of the write monitor unit 212, the read monitor unit 213, the self-diagnosis unit 214, and the repair processing unit 215.

The write monitor unit 212 monitors the data write operation of the operating unit 211, i.e. the data write operation by the OS and the application to the hardware, firmware, and the operating system file 21, and upon occurrence of a data write operation, writes and holds the new data not in the operating system file 21 but in the update data file 27 as update data, while at the same time recording the history thereof in the update log file 25.

The read monitor unit 213 monitors the data read operation of the operating unit 211, i.e. the data read operation by the OS and the application from the hardware, firmware, and the operating system file 21, and upon occurrence of a read operation, reads the corresponding data from the update data file 27 in the case where the update data for the particular data exists in the update file 27 and reads the corresponding data from the operating system file 21 in the case where the update data for the particular data is not existent in the update data file 27.

The self-diagnosis unit 214 executes the self-diagnosis of the computer 2 itself at an appropriate timing in response to an instruction, if any, from the user or when power is thrown in, for example, and determines the presence or absence of data to be repaired by the backup data. In the case where the self-diagnosis unit 214 determines that there exists data to be repaired, the repair processing unit 215 reads the required data from the backup file 23 and rewrites it thereby to repair the particular data, while at the same time repairing the operating system in accordance with the repair method stored in the repair method file 26 as described later.

Figure 2:
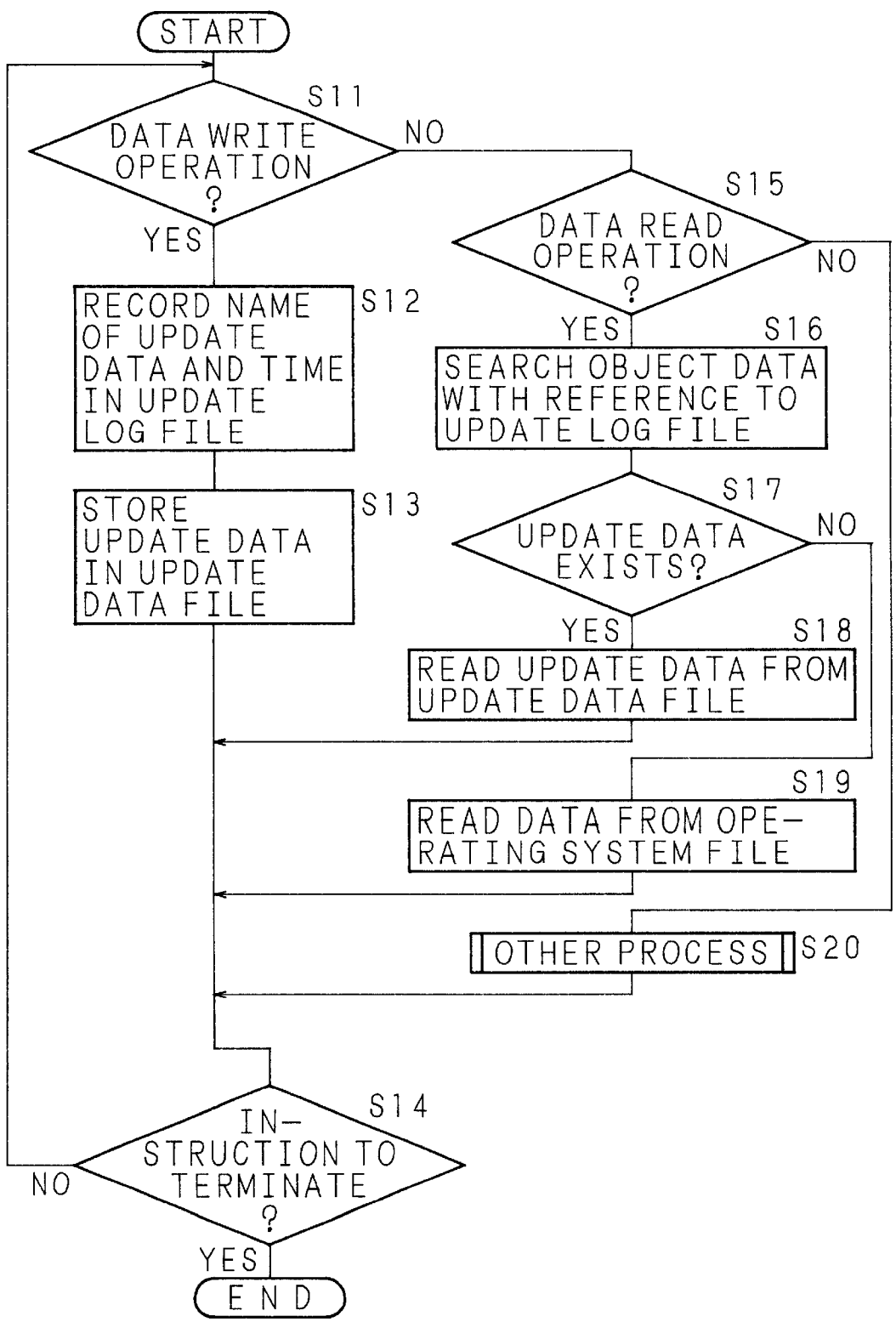
FIG. 2 is a flowchart showing the operating steps of a computer in normal operating conditions according to the first embodiment of the invention.

Now, the operation of the computer according to the first embodiment of the invention having the configuration described above will be explained with reference to a flowchart. FIG. 2 is a flowchart showing the operating steps for the computer according to the first embodiment of the invention in normal operating conditions.

In normal operating conditions, the computer 2 is ready for writing or reading data, so that the write monitor unit 212 monitors the data write operation and the read monitor unit 213 monitors the data read operation.

Upon occurrence of a write operation (YES in step S11), the write monitor unit 212 records the name of the newly written data as update data and the time in the update log file 25 (step S12), and stores the update data in the update data file 27 (step S13). At this time point, therefore, the data after update is stored as update data in the update data file 27, and at the same time, the data of the same name before update is stored in the operating system file 21 constituting the original data storage place. After that, in response to an instruction to terminate, if any (YES in step S14), the operation of the computer 2 is terminated, while in the absence of an instruction to terminate (NO in step S14), the process is returned to step S11 for continuing the operation.

Figure 4A:
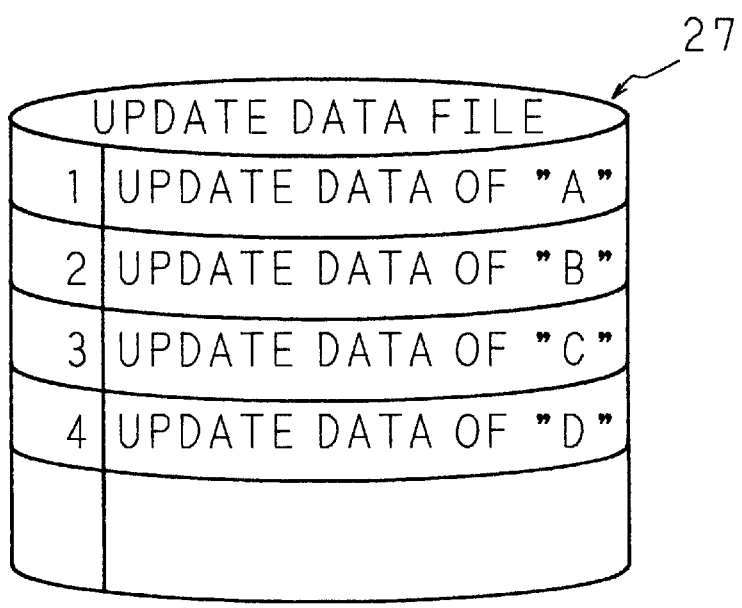
FIGS. 4A, 4B are model diagrams showing the contents stored in an update data file of a computer according to the first embodiment of the invention.

FIG. 3A is a model diagram showing the contents stored in the update log file 25, and FIG. 4A a model diagram showing the contents stored in the update data file 27. The update log file 25 has recorded therein, as shown in FIG. 3A, for example, No. 1 information to the effect that the data named "A" is updated at 01:00 (1:00 a.m.), Jan. 12, 1999, No. 2 information to the effect that the data named "B" is updated at 01:30 (1:30 a.m.), Jan. 12, 1999, No. 3 information to the effect that the data named "C" is updated at 01:31 (1:31 a.m.), Jan. 12, 1999, and No. 4 information to the effect that the data named "A" is updated at 02:00 (2:00 a.m.), Jan. 12, 1999.

The update data file 27, as shown in FIG. 4A, holds the update data of the data "A", "B", "C", "A" corresponding to each No. of information in the update log file 25. Thus, the data named "A" is stored not only in the operating system file 21 as the original data, but also in the update data file 27 in the form of the first update data as No. 1 data and in the form of the second update data as No. 4 data.

Upon occurrence of a data read operation (NO in step S11, YES in step S15), on the other hand, the read monitor unit 213 checks whether the data to be read exists as update data or not with reference to the update log file 25 (step S16), and in the case where it exists as the update data (YES in step S17), reads the particular data out of the update data file 27

(step S18). In the case where no data to be read exists as update data (NO in step S17), on the other hand, the read monitor unit 23 reads the data to be read, out of the operating system file 21 (step S19).' In response to a subsequent instruction, if any, to terminate (YES in step S14), the operation of the computer 2 is terminated, while in the absence of such an instruction (NO in step S14), the process is returned to step S11 for continuing the operation.

In the presence of an instruction other than to write or to read the data (NO in step S11, NO in step S15), the process is executed in response to the instruction (step S20).

In normal operating conditions, the computer 2 performs the aforementioned operation. Now, the operation in response to an instruction for maintenance will be explained with reference to the flowchart of FIG. 5. FIG. 5 is a flowchart showing the operating steps for maintenance of the computer according to the first embodiment of the invention.

Upon activation of the computer as power is thrown on, the self-diagnosis unit 214 is activated by the self-diagnosis software held in the self-maintenance system file 24 of the computer 2. First, the self-diagnosis of the computer 2 is carried out by the self-diagnosis unit 214 (step S31). A similar maintenance process can be carried out, however, in response to a user instruction at an arbitrary time point as well as when power is thrown on for the computer 2 whenever the maintenance process is possible.

The self-diagnosis by the self-diagnosis unit 214 checks whether the computer 2 can be activated or not (step S32), and in the case where it cannot be activated (NO in step S32), the repair processing unit 215 reads the corresponding data from the backup file 23 as a replacement to execute the repair process (step S33), as is well known. After that, the computer 2 starts the operation (step S34).

In the case where the computer 2 can be activated (YES in step S32), on the other hand, the following repair method stored in the repair method file 25 can be selected and executed.

First, in response to an instruction to restore the initial status (YES in step S35), the repair processing unit 215 discards all the contents stored in the update log file 25 and the update data file 27 (step S36). Then, assume that the data read operation of step S15 is executed as shown in the flowchart of FIG. 2 described above. In view of the fact that no information is recorded in the update log file 25 (NO in step S17), the data to be read is read from the operating system file 21, so that the initial status is restored in which the computer 2 is operated only based on the data held in the operating system file 21.

Figure 4B:
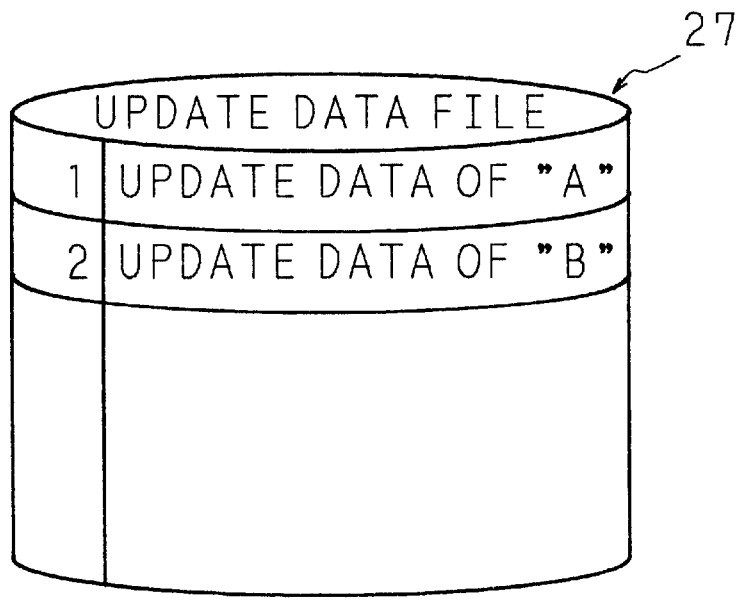

Then, in the case where an instruction to restore the status at an arbitrary time point is given (YES in step S37), the repair processing unit 215 discards both the information recorded in the update log file 25 after the designated arbitrary time point and the corresponding update data in the update data file 27 at the same time (step S38). Assume, for example, that the contents as shown in FIG. 3A are stored in the update log file 25. In the case where the time 1:30 a.m., Jan. 12, 1999, is designated, for example, the repair processing unit 215 discards the Nos. 3 and 4 information stored in the update log file 25 after the designated time point, while at the same time discarding the corresponding No. 3 update data "C" and the No. 4 update data "A" stored in the update data file 27. As a result, the data as shown in FIG. 3B is stored in the update log file 25, and the data as shown in FIG. 4B in the update data file 27.

Consequently, assume that the data is read in step S15 in the flowchart of FIG. 2.

In view of the fact that only the Nos. 1 and 2 information are recorded in the update log file 25, the No. 1 update data updated at 1:00 a.m., Jan. 12, 1999 earlier than the designated time of 1:30 a.m., Jan. 12, 1999 is read from the update data file 27 in the case where the data to be read is "A". Thus, the computer 2 is operated with the Nos. 1 and 2 update data stored in the update data file 27 and with the data of the operating system file 21 other than the data corresponding to the Nos. 1 and 2 update data stored in the update data file 27, thereby restoring the status at the designated time point of 1:30 a.m., Jan. 12, 1999. After that, the computer 2 starts the operation (step S34).

Further, in the case where an instruction is issued to update the operating system (YES in step S39), the repair processing unit 215 reads the update data from the update data file 27 in accordance with the contents stored in the update log file 25, and using such data, updates the contents stored in the operating system file 21 (step S40). As a result of this processing, the contents stored in the operating system file 21 are replaced by the update data in the case the update data is stored in the update data file 27, while they are left as they are in the case where the update data is not stored in the update data file 27, thereby updating the stored contents to the latest status. After that, the computer 2 starts the operation (step S34).

In the case where neither of the instructions described above is issued, the repair processing unit 215 maintains the previous status of the contents stored in the update log file 25 and the update data file 27 (step S41) and the computer 2 starts the operation (step S34).

Figure 6:
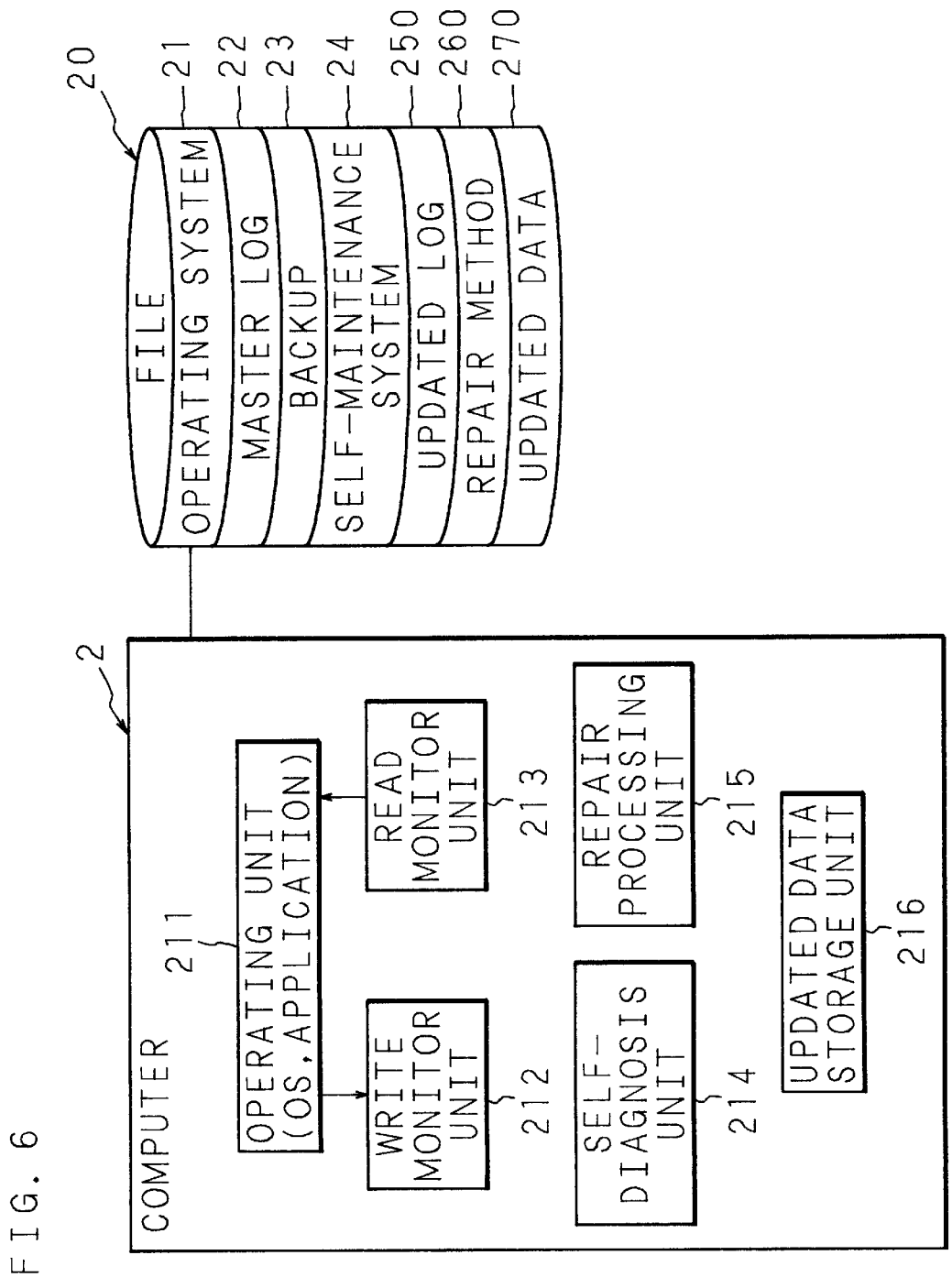
FIG. 6 is a model diagram showing an example configuration of a computer according to a second embodiment of the invention.

Now, a computer according to a second embodiment of the invention will be explained. FIG. 6 is a model diagram showing an example configuration of the computer according to the second embodiment of the invention.

In FIG. 6, reference numeral 2 designates a computer comprising hardware units such as a CPU, a memory, a disk unit (a hard disk, a flexible disk, etc.), a printer, a display unit, a keyboard, a mouse, etc., which constitute a multi-purpose computer connected with a large capacity storage medium 20 using such hardware equipment as a hard disk or a magnetic tape. This storage medium 20 is installed with an OS and various software components.

The storage medium 20 of the computer 2 has stored therein information in the form of file including an operating system file 21, a master log file 22, a backup file 23, a self-maintenance system file 24, an updated log file 250, a repair method file 260, an updated data file 270, etc.

The operating system file 21 has stored therein an OS and various application software in the form of files required for the computer 2. These software components, when executed by the computer 2, function as an operating unit 211, a write monitor unit 212, and a read monitor unit 213. Their functions are executed by way of the operating unit 211, in the case where the OS and the general application software such as the word processor and, the spreadsheet stored in the operating system file 21 are executed by the computer 2.

The master log file 22 holds the operation history of the computer 2 and is referred to at the time of self-maintenance. The backup file 23 has stored therein the backup data for the folder/file to be repaired at the time of self-maintenance of the computer 2 itself.

The self-maintenance system file 24 has stored therein various software in the form of files required for the self-maintenance of the computer 2 itself, and when these pieces of software are executed by the computer 2, functions as a self-diagnosis unit 214 and a repair processing unit 215.

In the case where the data are updated by the write operation, the history thereof is stored as log information in the updated log file 250. The repair method file 260 has stored therein a method of repairing the operating system file 21 as described later. The updated data file 270 has written therein the old data as the updated data in the write operation. Specifically, in the case where the update data is written in the operating system file 21, the old data updated is normally discarded. In the computer according to the second embodiment of the invention, however, such old data is written and held in the updated data file 270. The data not yet updated, i.e. the non-updated data is of course also held as it is in the operating system file 21.

Now, an explanation will be given of the internal functions of the computer 2 other than the operating unit 211, i.e. the functions of the write monitor unit 212, the read monitor unit 213, the self-diagnosis unit 214, the repair processing unit 215, and the updated data storage unit 216.

The write monitor unit 212 monitors the data write operation of the operating unit 211, i.e., the data write operation by the OS and the applications to the hardware, firmware and the operating system file 21, and upon occurrence of, a data write operation, records the history thereof in the updated log file 250.

The read monitor unit 213 monitors the data read operation of the operating unit 211, i.e., the data read operation by the OS and the application from the hardware, firmware and the operating system file 21, and upon occurrence of a data read operation, reads the corresponding data from the operating system file 21.

The self-diagnosis unit 214 executes the self-diagnosis of the computer 2 itself at an appropriate timing such as in response to a instruction, if any, from the user or when power is thrown in, and determines the presence or absence of the data to be repaired by the backup data. The repair processing unit 215, upon determination of the presence of the data to be repaired by the self-diagnosis unit 214, reads the required data from the backup file 23 and rewrites it thereby to repair the particular data, while at the same time repairing the operating system in accordance with the repair method stored in the repair method file 260 as described later.

The updated data holding unit 216, upon determination of an occurrence of the data write operation by the write monitor unit 212, holds the data to be written, i.e., the old data before the write operation held in the operating system file 21 as the updated data in the updated data file 270.

Figure 7:
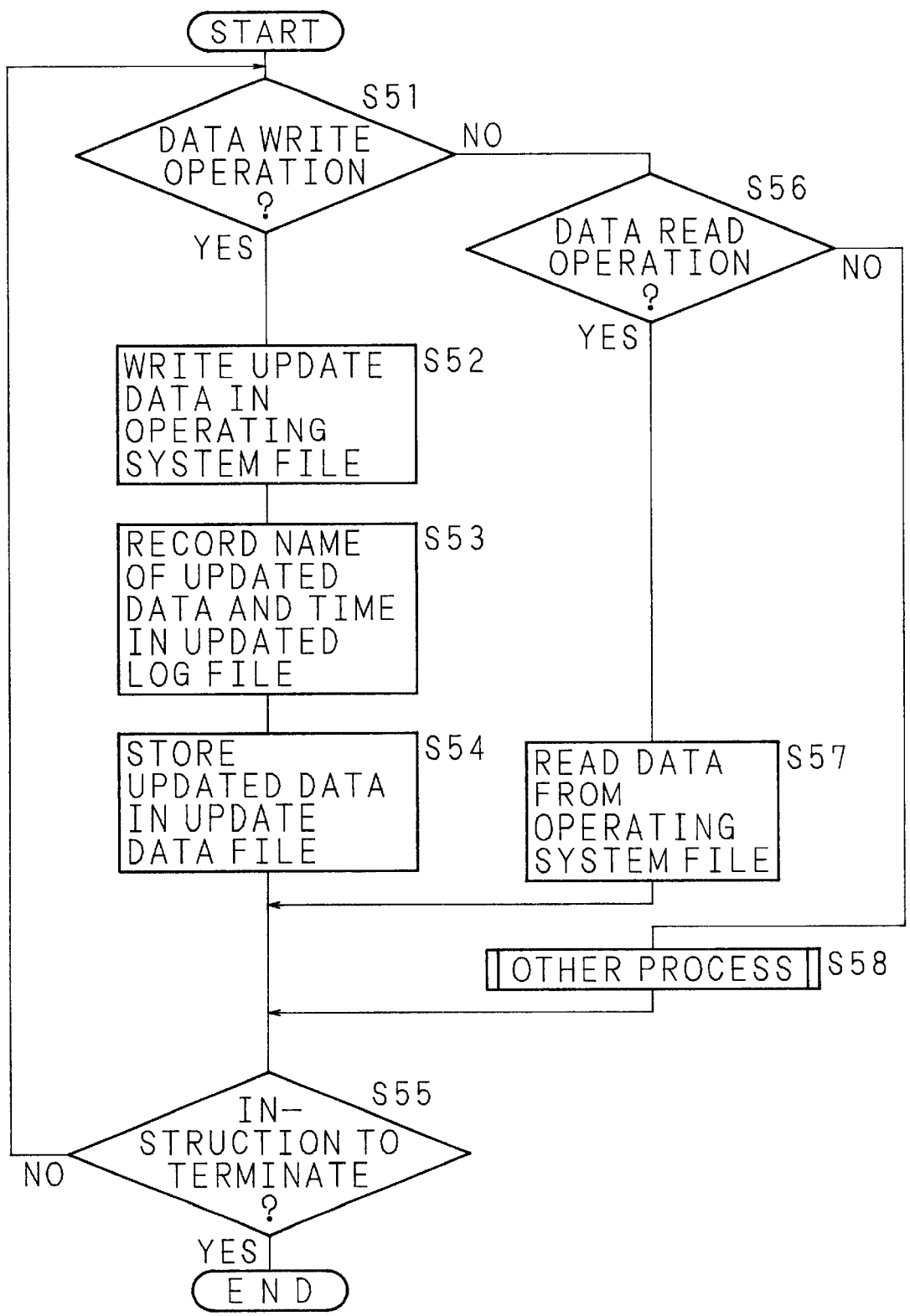
FIG. 7 is a flowchart showing the operating steps of a computer in normal operating conditions according to the second embodiment of the invention.

Now, the operation of the computer according to the second embodiment of the invention having the configuration described above will be explained with reference to a flowchart. FIG. 7 is a flowchart showing the operating steps for the computer according to the second embodiment of the invention in normal operating conditions.

In normal operating conditions, the computer 2 is ready for writing or reading data, so that the write monitor unit 212 monitors the data write operation and—the read monitor unit 213 monitors the data read operation.

Upon occurrence of a data write operation (YES in step S51), the write monitor unit 212 writes new write data as update data replacing the corresponding data in the operating system file 21 (step S52). At the same time, the updated data holding unit 216 records, in the updated log file 250, the data name of the old data in the operating system file 21 to be written as the updated data together with the time involved (step S53), and stores the updated data itself in the updated data file 270 (step S54).

Thus, at this time point, the data of the same name after update is stored in the original place of storage, i.e., the operating system file 21, and at the same time, the data before update is stored as updated data in the updated data file 270. After that, in response to an instruction, if any, to terminate (YES in step S55), the operation of the computer 2 is terminated. In the absence of such an instruction (NO in step S55), on the other hand, the process is returned to step S51 to continue the operation.

Figure 8A:
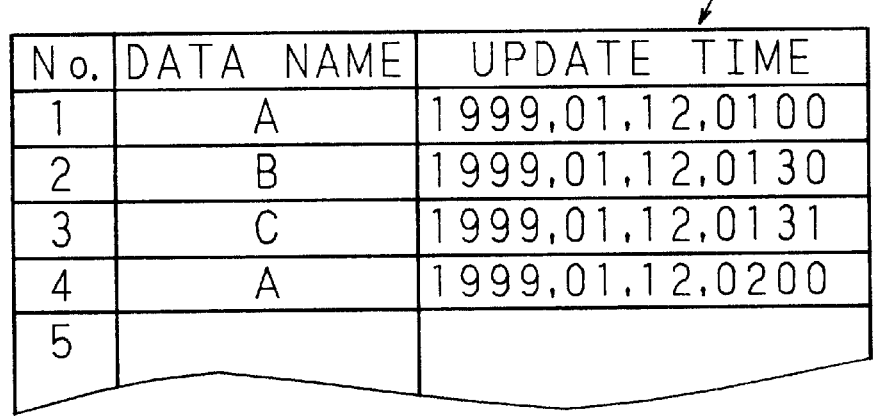
FIGS. 8A, 8B are model diagrams showing the contents stored in an updated log file of a computer according to the second embodiment of the invention.
Figure 9A:
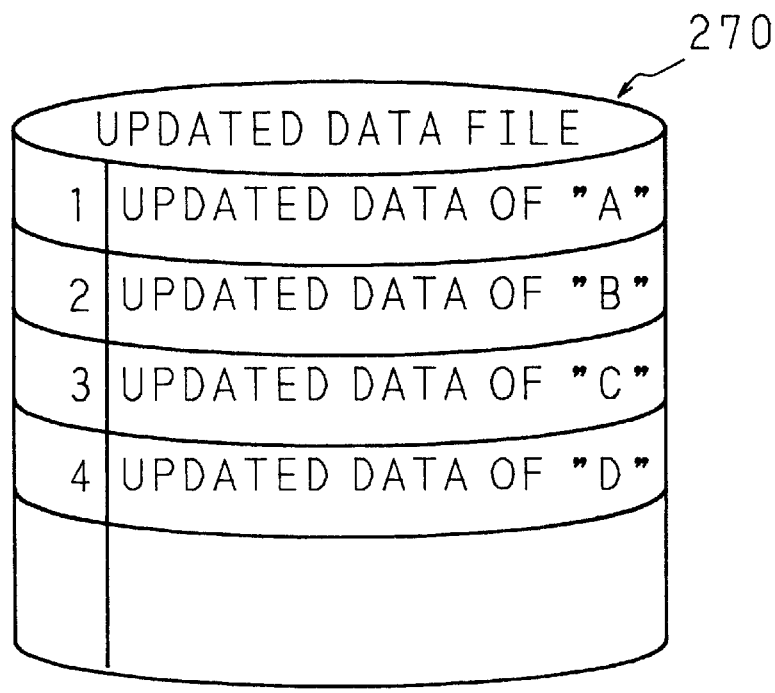
FIGS. 9A, 9B are model diagrams showing the contents stored in an updated data file of a computer according to the second embodiment of the invention.

FIG. 8A is a model diagram showing the contents stored in the updated log file 250, and FIG. 9A a model diagram showing the contents stored in the updated data file 270. The updated log file 250, as shown in FIG. 8A, for example, has recorded therein No. 1 information to the effect that the data named "A" is updated to 01:00 (1:00 a.m.),. Jan. 12, 1999, No. 2 information to the effect that the data named "B" is updated at 01:30 (1:30 a.m.), Jan. 12, 1999, No. 3 information to the effect that the data named "C" is updated at 01:31 (1:31 a.m.), Jan. 12, 1999, and No. 4 information to the effect that the data named "A" is updated at 02:00 (2:00 a.m.), Jan. 12, 1999.

The updated data file 270 holds, as shown in FIG. 9A, the updated data "A", "B", "C", "A" corresponding to the information of each number of the updated log file 250. Thus, the data named "A" is stored not only as the latest update data in the operating system file 21, but also as the immediately preceding updated data in the form of No. 4 data in the updated data file 270 and the second preceding updated data in the form of No. 1 data in the updated data file 270.

Upon occurrence of a data read operation (NO in step S51, YES in step S56), on the other hand, the read monitor unit 213 reads the data to be read, from the operating system file 21 (step S57). After that, in response to an instruction, if any, to terminate the process (YES in step S55), the operation of the computer 2 is terminated. In the absence of such an instruction, on the other hand (NO in step S55), the process is returned to step S51 and the operation is continued.

In response to an instruction, if any, neither to write nor to read data (NO in step S51, NO in step S56), the process meeting the instruction is executed (step S58).

Figure 11:
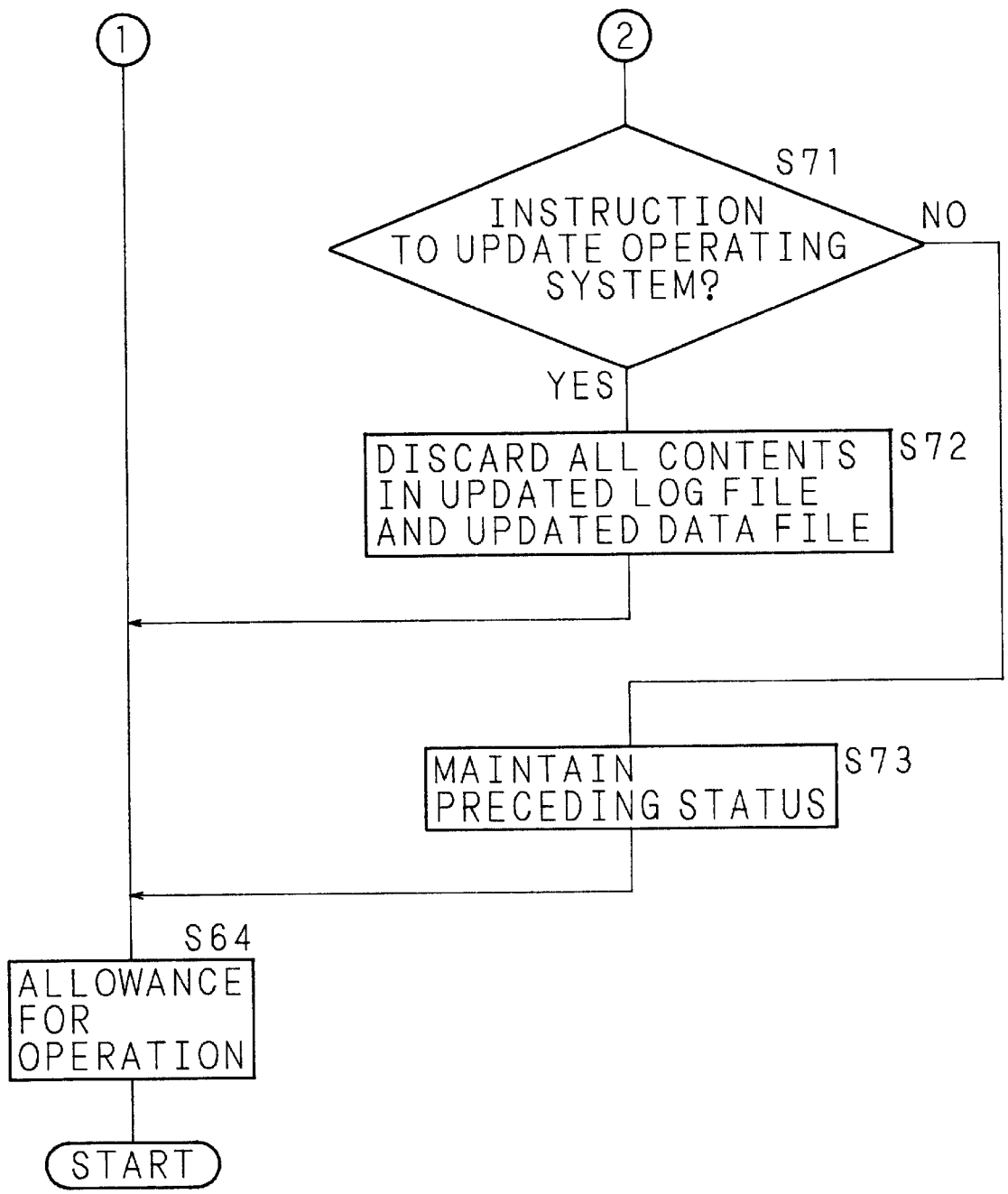
FIG. 11 is a flowchart showing the operating steps for the maintenance of a computer according to the second embodiment of the invention.

In normal operating conditions, the computer 2 performs the operation described above. Now, the operation in response to an maintenance instruction will be explained with reference to a flowchart. FIGS. 10 and 11 are flowcharts showing the operating steps of the maintenance process of the computer according to the second embodiment of the invention.

Upon activation of the computer 2 as power is thrown in, the self-diagnosis unit 214 is activated by the self-diagnosis software held in the self-maintenance system file 24 of the computer 2. First, the self-diagnosis of the computer 2 is executed by the self-diagnosis unit 214 (step S61). In this computer, however, a similar maintenance process is possible not only when power is thrown in but also in response to a user instruction given at an arbitrary time as far as the maintenance process is possible.

The self-diagnosis by self-diagnosis unit 214 checks whether the computer 2 can be activated or not (step S62), and in the case where it cannot be activated (NO in step S62), the repair processing unit 215 reads the corresponding data from the backup file 23 as a replacement to execute the repair process (step S63). This process is well known. After that, the computer 2 starts the operation (step S64).

In the case where the computer 2 can be activated (YES in step S62), in contrast, the following repair method stored in the repair method file 260 can be selected and executed.

First, when an instruction to restore the initial status is given (YES in step S65), the repair processing unit 215 reads the updated data from the updated data file 270 in accordance with the contents stored in the updated log file 250, and updates the contents stored in the operating system file 21 using the particular data (step S66). After that, all the contents stored in the updated log file 250 and the updated data file 270 are discarded (step S67).

As a result, in the case where the data read operation is executed instep S56 indicated in the flowchart of FIG. 7 described above, the data to be read is read from the operating system file 21, and therefore the computer 2 is restored to the initial status.

In the case where an instruction to restore to an arbitrary time point is issued (YES in step S68), on the other hand, the repair processing unit 215 restores the operating system file 21 using the corresponding updated data of the updated data file 270 in accordance with the information after the designated arbitrary time point which is recorded in the updated log file 250 (step S69).

Figure 8B:
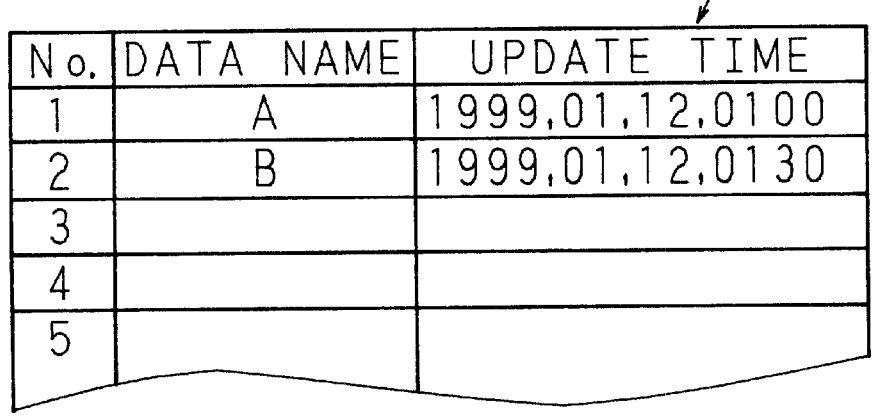
Figure 9B:
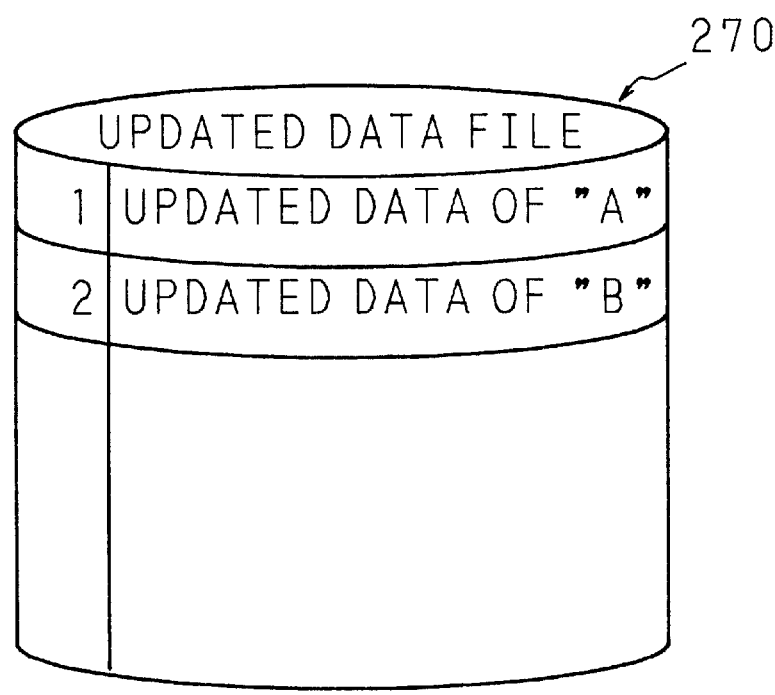

Assume, for example, that when the contents stored in the updated log file 250 are in the status as shown in FIG. 8A, the time of 1:30 a.m., Jan. 12, 1999 is designated. In accordance with the Nos. 3 and 4 information recorded in the updated log file 250, the repair processing unit 215 restores the operating system file 21 using the corresponding No. 3 updated data "C" and the No. 4 updated data "A" stored in the updated data file 270, after which the information in the updated log file 250 and the updated data stored in the updated data file 270 are discarded. As a result, the contents stored in the updated log file 250 assume the status as shown in FIG. 8B, and the contents stored in the updated data file 270 the status as shown in FIG. 9B.

As a result, in the case where the data is read in step S56 indicated in the flowchart of FIG. 7, the data "C" in the operating system file 21 is restored to the data before being updated to 1:31 a.m., Jan. 12, 1999, and the data "A" is restored to the data before being updated to 2:00 a.m., Jan. 12, 1999. Thus, it follows that the computer 2 is restored to the status at the designated time point of 1:30 a.m., Jan. 12, 1999. After that, the computer 2 starts the operation (step S64).

Further, in the case where an instruction is issued to update the operating system (YES in step S71), the repair processing unit 215 discards all the contents stored in the updated log file 250 and the updated data file 270 (step S72). As a result, only the contents stored in the operating system file 21 are validated, and therefore the operating system file 21 is updated. After that, the computer 2 starts the operation (step S64).

In the case where an instruction is not given for any of the processes described above, the repair processing unit 21, 1.~maintains the preceding status of the contents stored in the updated log file 250 and the updated data file 270 (step S73), and the computer 2 starts the operation (step S64).

According to the first and second embodiments of the invention, the self-maintenance similar to that of the prior art can be conducted, and in addition, the operating system file 21 can be repaired as described above. An application of the first and second embodiments including the conventional ordinary maintenance process will be explained.

In the conventional self-maintenance process, it is possible to quickly execute the process for maintaining the current status of the operating system file 21 or updating the operating system file 21 at the time of maintenance, and the process for writing or reading data into or from the operating system file 21 at the time of operation. According to the first embodiment of the invention, on the other hand, the process can be carried out quickly, at the time of maintenance, for restoring the operating system file 21 to the initial status or the status at an arbitrary time point, and for maintaining the current status of the operating system file 21. Further, according to the second embodiment of the invention, the process can be quickly executed for maintaining the current status of the operating system file 21 at the time of maintenance and the process for reading data from the operating system file 21 at the time of operation.

In view of the aforementioned facts, the conventional maintenance process is suitable for an application requiring high-speed processing at the time of operation and an application in which it is not desired to reduce the processing speed at the time of operation. The first embodiment of the invention, in contrast, is suitable for the case requiring a high-speed processing at the time of maintenance. Further, the second embodiment of the invention is suitable for the case where the restoration to the status at an arbitrary time point is often required at the time of maintenance, but the processing speed is not desirably reduced at the time of operation.

In the first and second embodiments described above, the invention is applied to the computer of stand-alone type. Nevertheless, the computer for performing the processing mentioned above can of course be connected to a network.

Figure 12:
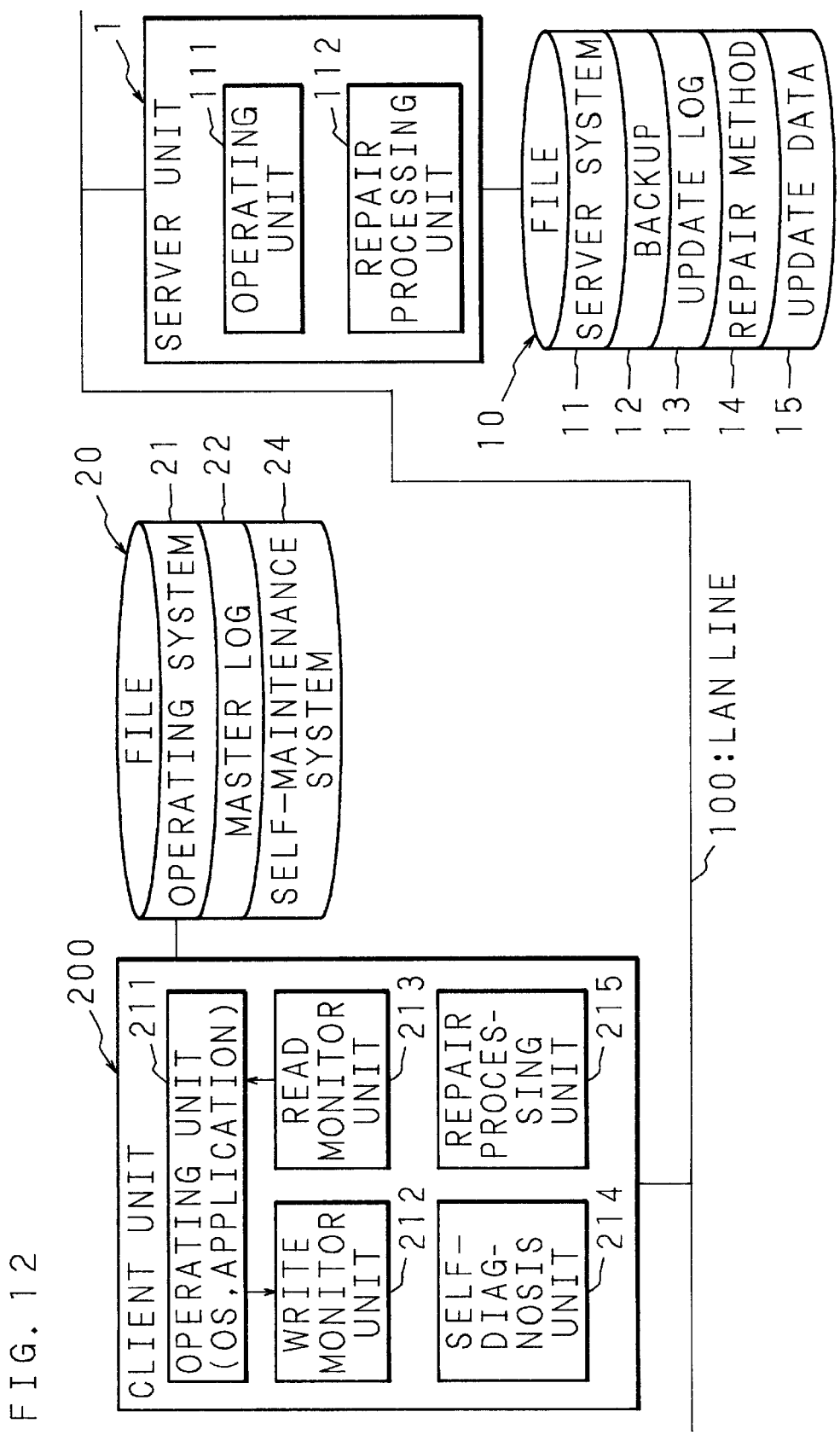
FIG. 12 is a block diagram showing a configuration example of a computer network system according to a first embodiment of the invention.

Also, in the aforementioned embodiments, the invention is applied to a stand-alone computer, but the invention is of course applicable to a computer network system such as a client/server system. First, an explanation will be given of the case where the computer according to the first embodiment of the invention shown in FIG. 1 is connected to a computer network system. FIG. 12 is a block diagram showing an example configuration of a computer network system according to the first embodiment of the invention.

In FIG. 12, reference numeral 1 designates a server unit constituting a server computer, and numeral 200 a client unit constituting a client computer. The two make up a computer network system connected by a LAN line 100. Although FIG. 12 shows one each of the server unit 1 and the client unit 200, a plurality of them can be connected through the LAN line 100. The client unit 200 is the computer to be monitored.

The server unit 1 is a multipurpose computer including hardware units such as a CPU, a memory, a disk unit (a hard disk, a flexible disk, etc.), a printer, a display unit, a keyboard, and a mouse, and is connected to a large capacity storage medium 10 using a hardware such as a hard disk or a magnetic tape. This storage medium 10 is installed with an OS and various software components.

The storage medium 10 of the server unit 1, in addition to a server system file 11 having stored therein the OS and various application software components in file form required for the operation of the server unit 1 itself, holds a backup file 12, an update log file 13, a repair method file 14, and an update data file 15, for each client unit 200, corresponding to the backup file 23, the update log file 25, the repair method file 26, and the update data file 27, respectively, included in the computer 2 shown in FIG. 1.

Thus, the storage medium 20 of the client unit 200 shown in FIG. 12 holds an operating system file 21, a master log file 22 and a self-maintenance system file 24. Also, the function of the client unit 200—is similar to that of the computer 2 shown in FIG. 1.

By the way, the server unit 1 includes, in addition to an operating unit 111 in charge of the operation of itself, a repair processing unit 112 corresponding to the repair processing unit 215 included in the computer 2.

The processing in each client unit 200 of the computer network system shown in FIG. 12 is basically the same as that of the computer 2 shown in FIG. 1. The difference lies in that the update data and the related log information are stored not in the storage medium 20 thereof but in the update log file 13 and the update data file 15 of the server unit 1 through the LAN line 100, and can be read through the LAN line 100 as required. Also, the repair method is also read from the repair method file 14 through the LAN line 100 and in accordance with this, the repair process is executed by the repair processing unit 215.

In the example configuration example shown in FIG. 12, not only the client unit 200 includes the repair processing unit 215, but also the server unit 1 includes the repair processing unit 112 having a similar function. In such a case, the repair processing unit 112 of the server unit 1 can execute the repair process of each client unit 200 in accordance with the repair method file 14 of the storage medium 10 of itself.

Figure 13:
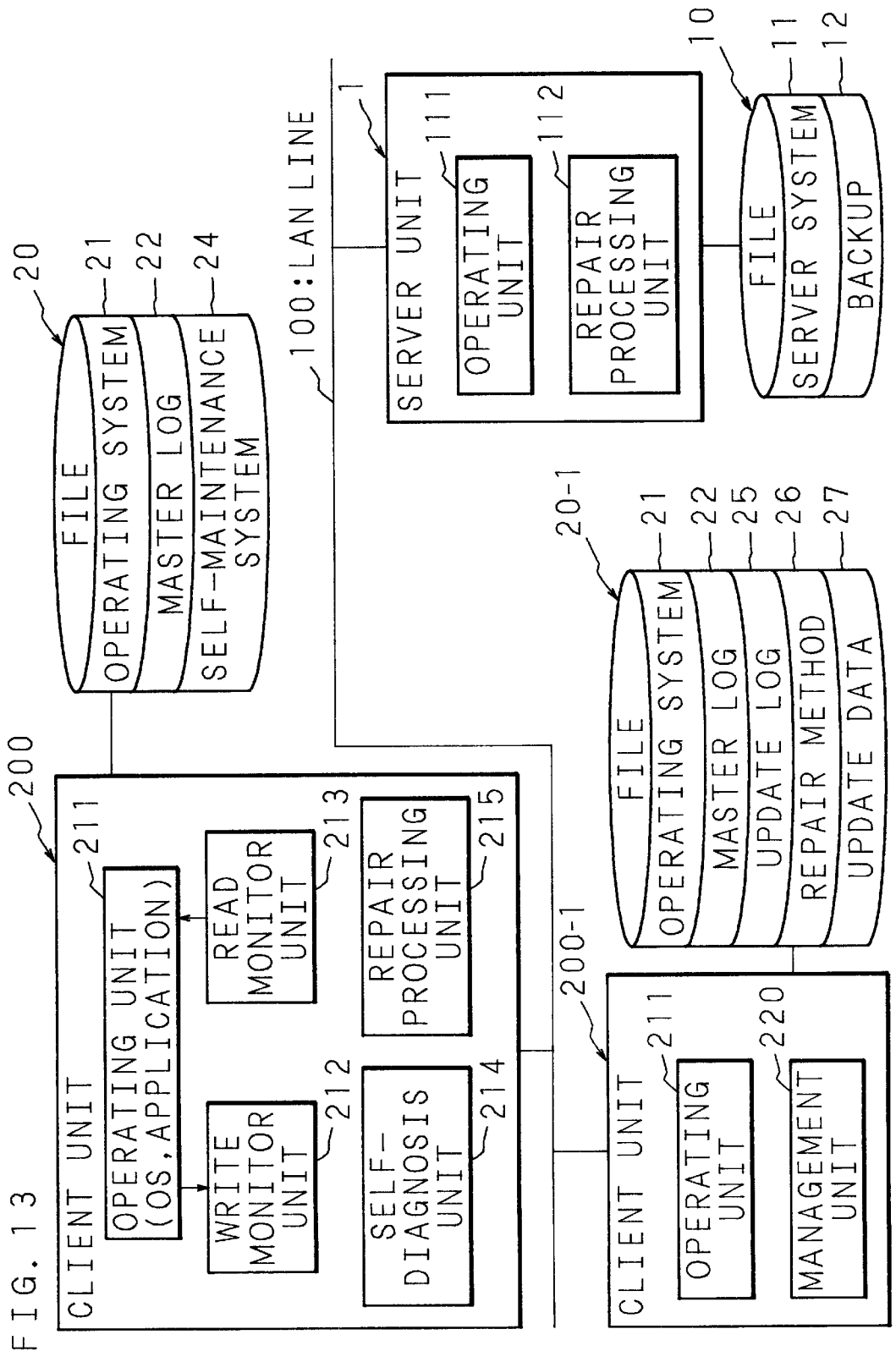
FIG. 13 is a block diagram showing another configuration example of a computer network system according to the first embodiment of the invention.

FIG. 13 is a block diagram showing another example configuration of a computer network system according to the first embodiment of the invention.

In this example, a client unit 200-1 for the network system manager, different from the server unit 1 and the client unit 200, is connected to the LAN line 100. This client unit 200-1 for the manager includes a management unit 220, and the storage medium 20-1 holds the update log file 25, the repair method file 26, and the update data file 27.

In this configuration example of the network system shown in FIG. 13, the maintenance process is executed in compliance with an instruction of the management unit 220 of the client unit 200-1 for the manager, and therefore the manager can easily make various settings through the client unit 200-1.

Figure 14:
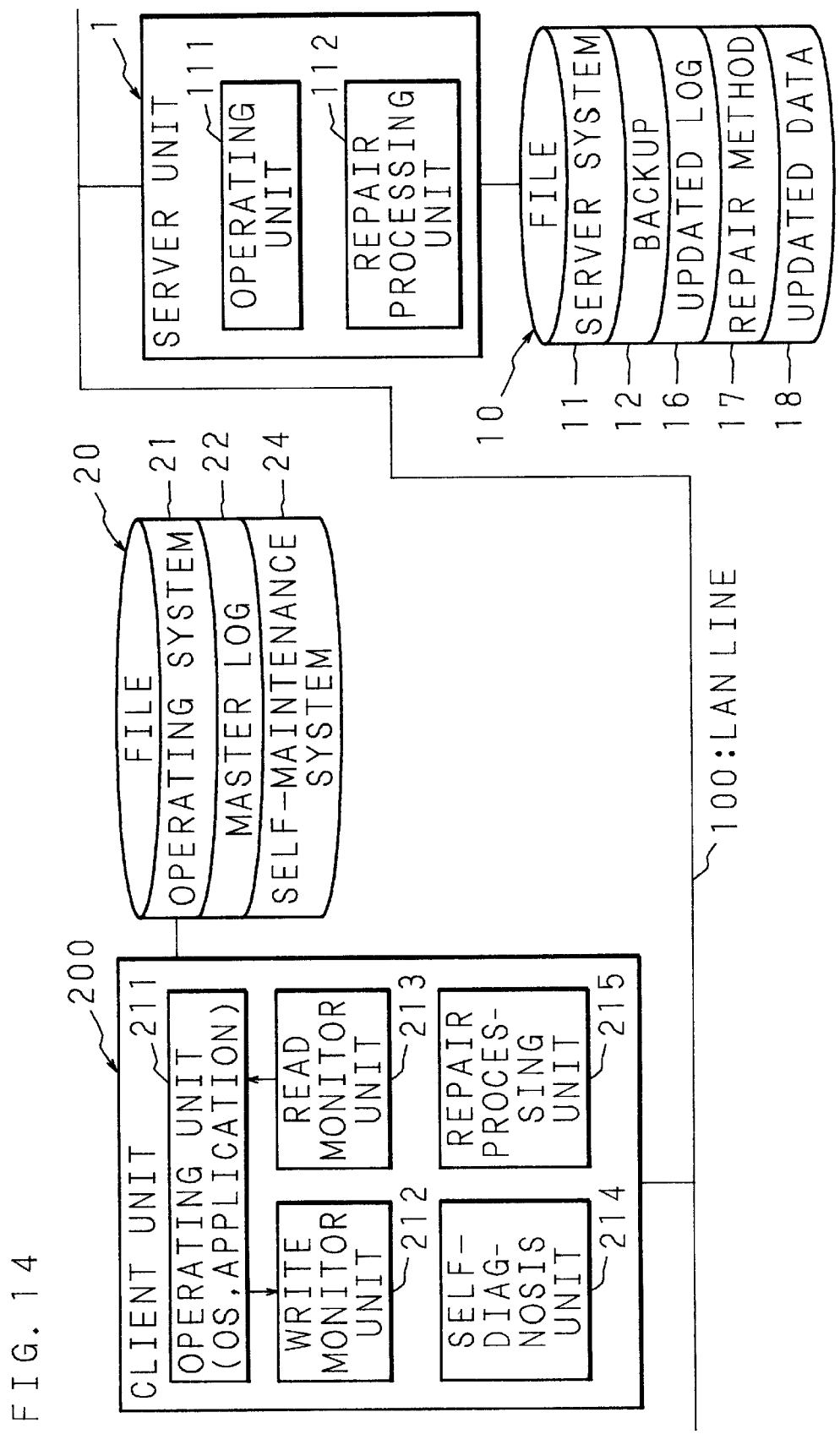
FIG. 14 is a block diagram showing a configuration example of a computer network system according to a second embodiment of the invention.

Now, an explanation will be given of the case where the computer according to the second embodiment of the invention shown in FIG. 6 is connected to a computer network system. FIG. 14 is a block diagram showing an example configuration of a computer network system according to the second embodiment of the invention.

In FIG. 14, reference numeral 1 designates a server unit constituting a server computer, and numeral 200 a client unit constituting a client computer. The two make up a computer network system connected by a LAN line 100. Although only one each of the server unit 1 and the client unit 200 are shown in FIG. 14, a plurality of them can be connected through the LAN line 100. The client unit 200 is the computer to be monitored.

The server unit 1 is a multipurpose computer including hardware units such as a CPU, a memory, a disk unit (a hard disk, a flexible disk, etc.), a printer, a display unit, a keyboard, and a mouse, and is connected to a large capacity storage medium 10 using a hardware such as a hard disk or a magnetic tape. This storage medium 10 is installed with the OS and various software components.

The storage medium 10 of the server unit 1, in addition to a server system file 11 having stored therein the OS and various application software components in file form required for the operation of the server unit 1 itself, holds a backup file 12, a updated log file 16, a repair method file 17, and an updated data file 18, for each client unit 200, corresponding to the backup file 23, the updated log file 250, the repair method file 260, and the updated data file 270, respectively, included in the computer 2 shown in FIG. 6.

Thus, in the client/server system shown in FIG. 14, the storage medium 20 of the client unit 200 holds an operating system file 21, a master log file 22, and a self-maintenance system file 24.

The processing in each client unit 200 of the computer network system shown in FIG. 14 is basically the same as that of the computer 2 shown in FIG. 6. The difference, however, lies in that the updated data and the related log information are stored not in the storage medium 20 thereof but in the updated log file 16 and the updated data file 18 of the server unit 1 through the LAN line 100, and are read as required from them through the LAN line 100. The repair method is also read from the repair method file 17 through the LAN line 100, and in accordance with the method, the repair processing unit 215 executes the repair process.

In the configuration example of FIG. 14, not only the client unit 200 includes the repair processing unit 215 but also the server unit 1 includes the repair processing unit 112 having a similar function. In such a case, the repair processing unit 112 of the server unit 1 can execute the repair process of each client unit 200 in accordance with the repair method file 14 of the recording medium 10 of itself.

Figure 15:
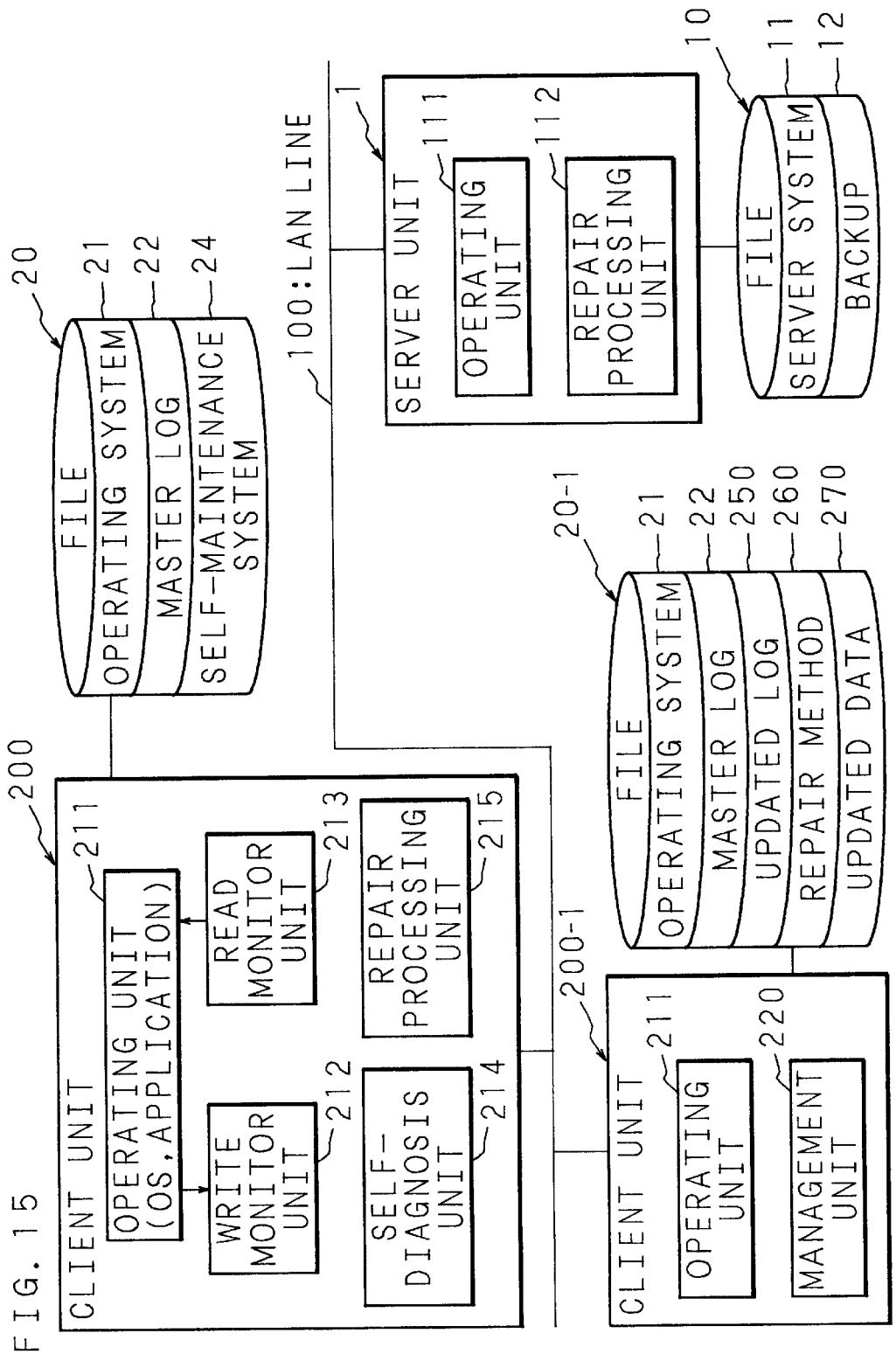
FIG. 15 is a block diagram showing another configuration example of a computer network system according to the second embodiment of the invention.

FIG. 15 is a block diagram showing another example configuration of a computer network system according to the second embodiment of the invention.

In this example, a client unit 200-1 for the network system manager which is different from the server unit 1 and the client unit 200 is connected to the LAN line 100. This client unit 200-1 for the manager includes a management unit 220, and the storage medium 20-1 holds the updated log file 250, the repair method file 260, and the updated data file 270.

In this configuration example of the network system shown in FIG. 15, the maintenance process is executed in compliance with an instruction of the management unit 220 of the client unit 200-1 for the manager, and therefore the manager can easily make various settings through the client unit 200-1.

By the way, the computer 2 according to the invention, the server unit 1 and further, the client unit 200-1 for the manager, can be realized by installing a multipurpose computer such as a personal computer, for example, with the software program for the backup processing recorded in the recording medium.

Figure 16:
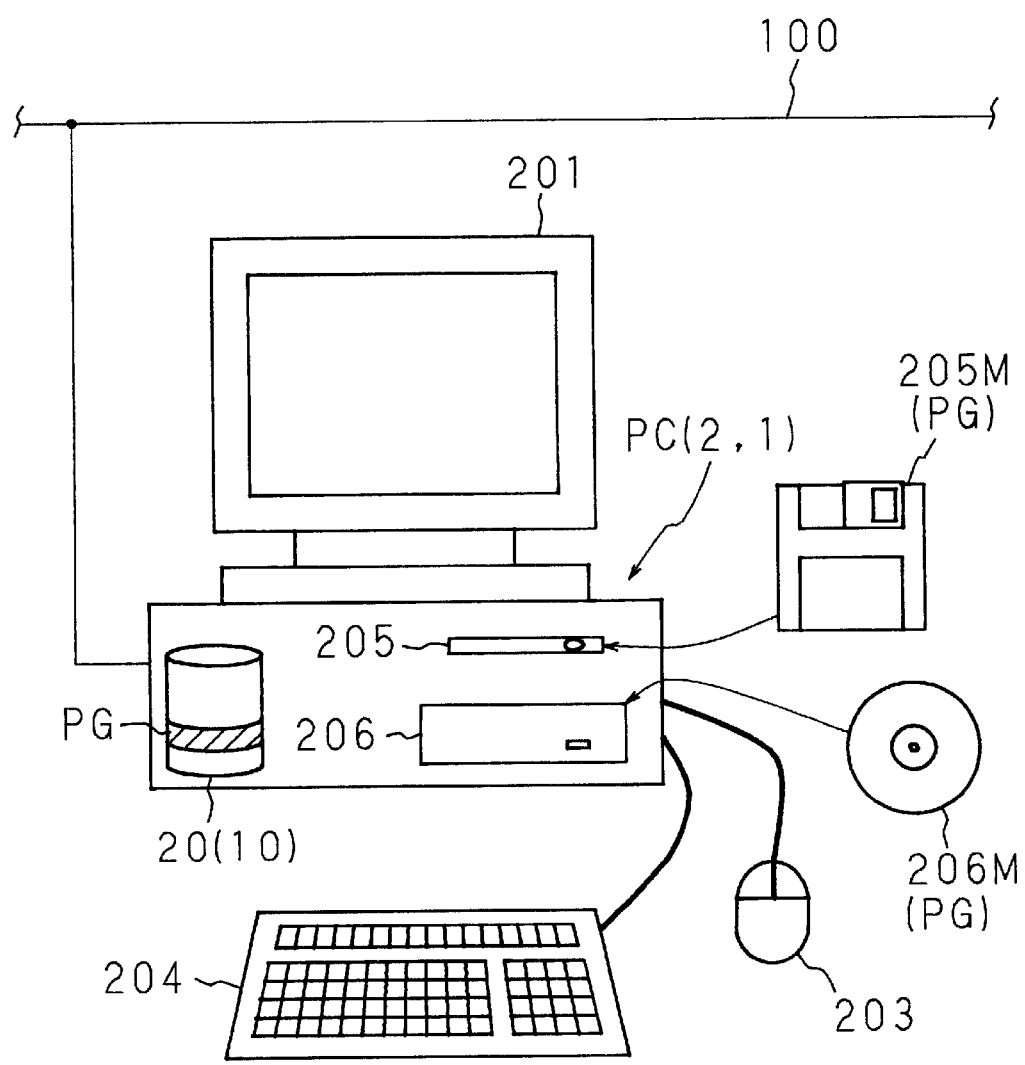
FIG. 16 is a model diagram showing a configuration example of a multipurpose computer constituting a computer according to the invention.

FIG. 16 is a model diagram showing the outer appearance of the personal computer PC constituting a multipurpose computer. This personal computer PC includes a flexible disk drive 205 for reading the contents (program code) from a flexible disk 205M having recorded therein the program PG for providing the function of the computer 2, the server unit 1 or the client unit 200-1 for the manager according to the invention as described above, and/or a CD-ROM drive 206 for reading the contents (program code) from a CD-ROM 206M having recorded therein the program PG described above.

Reference numeral 201 designates a display unit such as a CRT display, numeral 203 a pointing device such as a mouse, and numeral 204 an input device such as a keyboard. The code of the program PG read from the flexible disk 205M by the flexible disk drive 205 or the code of the program PG read from the CD-ROM 206M by the CD-ROM drive 206 is installed, for example, in a storage medium 20 (10) using a hard disk, and as described above, functions as various functional units such as the operating unit 211.

Although the flexible disk and/or the CD-ROM is shown as a recording medium above, the invention is not limited to such a component part, but by combining with an appropriate drive (read means), the magnetic tape or the magneto-optical disk can of course be used.

Reference numeral 100 designates a LAN line for connecting another computer (server unit) or a management center with the personal computer PC. Thus, the program PG can be installed from other computers or the management center through the LAN line 100.

FIG. 17 is a model diagram showing the contents of the program PG, i.e.—the program code for realizing the function of the computer 2 according to the first embodiment of the invention recorded in the flexible disk 205M constituting an example of the recording medium.

The flexible disk 205M shown in FIG. 17 is a computer readable recording medium having recorded therein a computer program for the computer storing the data used for the operation of itself. Specific contents of the particular computer program are as follows.

The flexible disk 205M has stored therein a program code PC11 for monitoring that the stored data is replaced by writing the corresponding update data, a program code PC12 for storing the update data upon detection that the update data is written, a program code PC13 for storing the history information of the stored update data, a program code PC14 for monitoring the read operation of the stored data, a program code PC15 for reading the corresponding update data in the case where the history information for the data to be read is stored, when executing a stored data read operation, a program code PC16 for reading the corresponding non-updated data in the case where the history information for the data to be read is not stored, when executing a stored data read information, a program code PC17 for discarding the stored update data and the stored history information in response to an instruction, if any, to restore the initial status of the stored data, a program code PC18 for discarding the stored history information after a designated time point and the corresponding stored update data in response to an instruction, if any, to restore the status of the stored data at the designated time point, and a program code PC19 for replacing the non-updated data with the corresponding stored update data and discarding the stored update data and the history information in response to an instruction, if any, to update the stored data.

The computer 2 reads the program PG recorded in the flexible disk 205M as an example of such a recording medium and thus exhibits the functions of the computer according to the first embodiment of the invention described above.

FIG. 18 is a model diagram showing the contents of the program PG, i.e., the program code for realizing the function of the computer 2 according to the second embodiment of the invention recorded in the flexible disk 205M constituting an example of the recording medium.

The flexible disk 205M shown in FIG. 18 is a computer readable recording medium having recorded therein a computer program for the computer storing the data used for the operation of itself. Specific contents of the particular computer program are as follows.

The flexible disk 205M has stored therein a computer program including program code PC21 for monitoring that the stored data is replaced by writing the corresponding update data, a program code PC22 for storing the updated data replaced by the update data upon detection that the update data is written, a program cod e PC23 for storing the history information of the stored updated data, a program code PC24 for replacing the update data with the stored corresponding updated data and discarding the stored updated data and the history information in response to an instruction, if any, to restore the initial status of the stored data, a PC program code PC25 for replacing the update data with the corresponding updated data stored after a designated time point in accordance with the stored history information and discarding the updated data and the corresponding history information stored after the designated time point in response to an instruction, if any, to restore the status of the stored data at the designated time point, and a program code PC26 for discarding the stored updated data and the history information in response to an instruction, if any, to update the stored data.

The computer 2 reads the program PG recorded in the flexible disk 205M as an example of such a recording medium and thus exhibits the functions of the computer according to the second embodiment of the invention described above.

By the way, each program code recorded in the flexible disk 205M constituting an example of the recording medium shown in FIGS. 17 and 18 is read distributively by the server unit 1 or the client unit 200-1 of the computer network system of the invention shown in FIGS. 12 to 15, so that these functions can of course be realized as those of the multipurpose computer.

In the foregoing description of the computer, the computer network system and recording medium, the operating system file 21 of course includes the data files produced by application programs as well as the OS, the application programs, etc. required for the operation of the particular computer. In general application programs, the "restore" processing is possible, it is limited to the period on and after the last time point when the file is opened. In an application of the invention holding a data file in the operating system file 21, however, the data file can be restored retroactively to anytime point from the time when the data file is newly produced.

As described in detail above, according to the present invention, a computer is realized which can be restored to the status at an arbitrary time point including the initial status by monitoring the write operation into the operating system file.

Also, according to this invention, a computer network system can be realized, which can be restored to the status at an arbitrary time point including the initial status by monitoring the write operation into the operating system file of each computer connected to the network system.

Further, according to this invention, a recording medium is realized constituting the computer and the computer network system described above.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A computer comprising:
   a storage medium; and
   a controller coupled to said storage medium and capable of performing the following operations:
   (i) storing in said storage medium, in the case where data used for the operation of the computer itself is replaced by writing update data, the update data, updated data replaced by the update data, and non-updated data not yet replaced by the update data;

(ii) reading, when executing data that is read out from said storage medium, the update data, if any, corresponding to the data to be read and the non-updated data corresponding to said data to be read in the absence of said update data;

(iii) discarding the update data in response to a first instruction, if any, to restore said storage medium to its initial status;

(iv) discarding the update stored in said storage medium after a designated arbitrary time point in response to a second instruction, if any, to restore said storage medium to the status at the designated arbitrary time point; and (v) replacing the updated data with corresponding update data in response to a third instruction, if any, to update said storage medium.

2. A computer comprising:

data storage means for storing, in the case where data used for the operation of the computer itself is replaced by writing update data, the update data, updated data replaced by the update data, and non-updated data not yet replaced by the update data;

read monitor means for reading the update data, if any, corresponding to the data to be read and the non-updated data corresponding to said data to be read in the absence of said update data, when executing data that is read out from said data storage means; and repair means for:
discarding the update data in response to a first instruction, if any, to restore said data storage means to its initial status, discarding the update data stored in said data storage means after a designated arbitrary time point in response to a second instruction, if any, to restore said data storage means to the status at the designated arbitrary time point, and replacing the updated data with corresponding update data in response to a third instruction, if any, to update said data storage means.

3. A computer comprising:

a storage medium; and a controller coupled to said storage medium and capable of performing the following operations:

(i) storing data used to operate the computer itself in said storage medium;

(ii) monitoring that the data stored in said storage medium is replaced by writing update data that corresponds to the data that is stored;

(iii) storing the update data in said storage medium upon detection that a data updating process is to be performed;

(iv) storing in said storage medium history information of the update data in the case where the update data is stored in said storage medium;

(v) reading the update data from said storage medium in the case where the history information for the update data is stored in said storage medium and reading non-updated data from said storage medium in the case where the history information for the update data is not stored in said storage medium, when executing data that is read out from said storage medium;

(vi) discarding the update data and the history information in response to a first instruction, to restore said storage medium to its initial status;

(vii) discarding the history information stored after a designated arbitrary time point and the corresponding update data in response to a second instruction, to restore said storage medium to the status at the designated arbitrary time point; and (viii) replacing the non-updated data with the update data and discarding the update data and the history information in response to a third instruction, to update said storage medium.

4. A computer comprising:

operating system storage means for storing the data used to operate the computer itself;

write monitor means for monitoring that the data stored in said operating system storage means is replaced by writing update data that corresponds to the data that is stored;

update data storage means for storing the update data in the case where said write monitor means detects that a data updating process is to be performed;

update log storage means for storing history information of the update data in the case where the update data is stored in said update data storage means;

read monitor means for reading the update data from said update data storage means in the case where the history information for the update data is stored in said update log storage means and reading non-updated data from said operating system storage means in the case where the history information for the update data is not stored in said update log storage means, when executing data that is read out from said operating system storage means;

repair means for:
discarding the contents stored in said update data storage means and said update log storage means in response to a first instruction, if any, to restore said operating system storage means to its initial status, discarding the history information after a designated arbitrary time point stored in said update log storage means and the update data stored in said update data storage means in response to a second instruction, if any, to restore said operating system storage means to the status at the designated arbitrary time point, and replacing the non-updated data stored in said operating system storage means with the update data stored in said update data storage means while at the same time discarding the contents stored in said update data storage means and said update log storage means in response to a third instruction, if any, to update said operating system storage means.

5. A computer comprising:

a storage medium; and a controller coupled to said storage medium and capable of performing the following operations:

(i) storing data used to operate the computer itself in said storage medium;

(ii) monitoring that the data stored in said storage medium is replaced by writing update data that corresponds to the data that is stored;

(iii) storing in said storage medium updated data which is included in the data stored in said storage medium and replaced by the update data, in the case where the update data is written in said storage medium;

(iv) storing history information of the updated data in said storage medium in the case where the updated data is stored in said storage medium;

(v) replacing the update data with the updated data stored in said storage medium and discarding the updated data that is stored in the storage medium and the history information in response to a first instruction to restore, said storage medium to its initial status;

(vi) replacing the update data with the updated data stored after a designated arbitrary time point in accordance with the history information stored in said storage medium and discarding the history information after the designated arbitrary time point and the updated data that is stored in the storage medium in response to a second instruction to restore said storage medium to the designated arbitrary time point; and (vii) discarding the updated data and the history information in response to a third instruction to update said storage medium.

6. A computer comprising:

operating system storage means for storing data used to operate said computer itself;

write monitor means for monitoring that the data stored in said operating system storage means is replaced by writing update data that corresponds to the data that is stored;

updated data storage means for storing updated data which is included in the data stored in said operating system storage means and replaced by the update data in the case where said write monitor means detects that the update data is written;

updated log storage means for storing history information of the updated data in the case where the updated data is stored in said updated data storage means; and repair means for:

replacing the update data stored in said operating system storage means with the updated data stored in said updated data storage means and discarding the contents stored in said updated data storage means and said updated log storage means in response to a first instruction, if any, to restore said operating system storage means to its initial status, replacing the update data stored in said operation system storage means with the updated data stored in said updated data storage means after a designated arbitrary time point in accordance with the history information stored in said updated log storage means and discarding the history information after the designated arbitrary time point stored in said updated log storage means and the updated data stored in said updated data storage means in response to a second instruction, if any, to restore said operating system storage means to the status at the designated arbitrary time point, and discarding the contents stored in said updated data storage means and said updated log storage means in response to a third instruction, if any, to update said operating system storage means.

7. A computer network system comprising:

a first storage medium;

a second storage medium;

a third storage medium;

a plurality of computers including a computer to be monitored; and a line for interconnecting said first storage medium, said second storage medium, said third storage medium and said plurality of the computers;

wherein said computer to be monitored includes a first controller capable of performing the following operations:

(i) storing data used to operate said computer itself in said first storage medium;

(ii) monitoring that the data stored in said first storage medium is replaced by writing update data therein that corresponds to the data that is stored;

(iii) monitoring that the data is read from said first storage medium;

(iv) storing the update data in said second storage medium upon detection that a data updating process is to be performed in said first storage medium;

(v) storing history information of the update data in said third storage medium in the case where the update data is stored in said second storage medium;

(vi) reading the update data from said second storage medium in the case where the history information for the update data from said first storage medium is stored in said third storage medium, when reading the data from said first storage medium; and (vii) reading non-updated data from said second storage medium in the case where the history information for the update data is not stored in said third storage medium, when reading the data from said first storage medium;

wherein any one of said plurality of the computers includes a second controller capable of performing the following operations:

(viii) discarding the update data stored in said second storage medium and the history information stored in said third storage medium in response to a first instruction to restore said first storage medium to its initial status;

(ix) discarding the history information, which is stored in the third storage medium, after a designated arbitrary time point and the update data, which is stored in said second storage medium, in response to a second instruction to restore said first storage medium to its initial status at the designated arbitrary time point; and (x) replacing the non-updated data stored in said second storage medium with the corresponding update data stored in said second storage medium and discarding the update data stored in said second storage medium and the history information stored in said third storage medium in response to a third instruction to update said first storage medium.

8. A computer network system comprising:

a plurality of computers including a computer to be monitored, which has operating system storage means for storing data used to operate the computer itself, write monitor means for monitoring that the data stored in said operating system storage means is replaced by writing update data that corresponds to the data that is stored, and read monitor means for monitoring that the data is read from said operating system storage means;

update data storage means for storing the update data in the case where said write monitor means detects that a data updating process is to be performed;

update log storage means for storing history information of the update data in the case where the update data is stored in said update data storage means; and a line for interconnecting said plurality of the computers, said update data storage means, and said update log storage means;

wherein said read monitor means reads the update data from said update data storage means in the case where the history information for the update data is stored in said update log storage means and reads non-updated data from said operating system storage means in the case where the history information for the update data is not stored in said update log storage means, when executing data that is read out from said operating system storage means; and wherein any one of said plurality of the computers includes repair means for:

discarding the contents stored in said update data storage means and said update log storage means in response to a first instruction, if any, to restore said operating system storage means to its initial status, discarding the history information, which is stored in the update log storage means, after a designated arbitrary time point and the update data, which is stored in said update data storage means, in response to a second instruction, if any, to restore said operating system storage means to its initial status at the designated arbitrary time point, and replacing the non-updated data stored in said operating system storage means with the update data stored in said update data storage means and discarding the contents stored in said update data storage means and said update log storage means in response to a third instruction, if any, to update said operating system storage means.

9. A computer network system comprising:

a first storage medium;

a second storage medium;

a third storage medium;

a plurality of computers including a computer to be monitored; and a line for interconnecting said first storage medium, said second storage medium, said third storage medium, and said plurality of the computers;

wherein said computer to be monitored includes a first controller capable of performing the following operations:

(i) storing data used to operate said computer itself in said first storage medium;

(ii) monitoring that the data stored in said first storage medium is replaced by writing update data therein;

(iii) storing in said second storage medium updated data replaced by the update data included in the data stored in said first storage medium upon detection that the update data is written in said first storage medium; and (iv) storing history information of the updated data in said third storage medium in the case where the updated data is stored in said second storage medium;

wherein any one of said plurality of the computers includes a second controller capable of performing the following operations:

(v) replacing the update data stored in said first storage medium with the updated data stored in said second storage medium and discarding the updated data stored in said second storage medium and the history information stored in said third storage medium in response to a first instruction, to restore said first storage medium to its initial status;

(vi) replacing the update data stored in said first storage medium with the updated data stored in said second storage medium after a designated arbitrary time point in accordance with the history information stored in said third storage medium and discarding the history information, which is stored in the third storage medium, after the designated arbitrary time point and the corresponding updated data, which is stored in said second storage medium, in response to a second instruction, to restore said first storage medium to its initial status at the designated arbitrary time point; and (vii) discarding the updated data stored in said second storage medium and the history information stored in said third storage medium in response to a third instruction, to update said first storage medium.

10. A computer network system comprising:

a plurality of computers including a computer to be monitored, the computer to be monitored having operating system storage means for storing data used to operate the computer itself, and write monitor means for monitoring that the data stored in said operating system storage means is replaced by writing update data that corresponds to the data that is stored therein;

updated data storage means for storing updated data which is included in the data stored in said operating system storage means and replaced by the update data in the case where said write monitor means detects that the update data is written;

updated log storage means for storing history information of the updated data in the—case where the updated data is stored in said updated data storage means; and a line for interconnecting said plurality of the computers, said updated data storage means and said updated log storage means;

wherein any one of said plurality of the computers includes repair means for:

replacing the update data stored in said operating system storage means with the updated data stored in said updated data storage means and discarding the contents stored in said updated data storage means and said updated log storage means in response to a first instruction, if any, to restore said operating system storage means to its initial status, replacing the update data stored in said operating system storage means with the updated data stored after a designated arbitrary time point stored in said updated data storage means in accordance with the history information stored in said updated log storage means and discarding the history information, which is stored in the updated log storage means, after the designated arbitrary time point and the corresponding updated data, which is stored in said updated data storage means, in response to a second instruction, if any, to restore said operating system storage means to its initial status at the designated arbitrary time point, and discarding the contents stored in said updated data storage means and said updated log storage means in response to a third instruction, if any, to update said operating system storage means.

11. A recording medium having computer readable program code for operating a computer storing data used to operate said computer itself, said computer readable program code comprising:

means for causing said computer to monitor that the stored data is replaced by writing update data that corresponds to the data that is stored;

means for causing said computer to store the update data upon detection that a data updating process is to be performed;

means for causing said computer to store history information of the update data in the case where the update data is stored;

means for causing said computer to monitor that the stored data is read;

means for causing said computer to read the update data in the case where the history information for the update data is stored when reading the stored data;

means for causing said computer to read non-updated data in the case where the corresponding history information for the data to be read is not stored when reading the stored data;

means for causing said computer to discard the stored update data and the stored history information in response to a first instruction, to restore an initial status of the stored data;

means for causing said computer to discard the history information included in the stored history information after a designated arbitrary time point and the stored update data in response to a second instruction, to restore the initial status of the stored data at the designated arbitrary time point; and means for causing said computer to replace the non-updated data with the stored update data and discard the stored update data and the stored history information in response to a third instruction, to update the stored data.

12. A recording medium having computer readable program code for operating a computer storing data used to operate said computer itself, said computer readable program code comprising:

means for causing said computer to monitor that the stored data is replaced by writing update data that corresponds to the data that is stored;

means for causing said computer to store updated data which is included in the stored data and replaced by the update data in the case where it is detected that the update data is written;

means for causing said computer to store history information of the updated data in the case where the updated data is stored;

means for causing said computer to replace the update data with the stored updated data and discard the stored updated data and the stored history information in response to a first instruction, to restore an initial status of the stored data;

means for causing said computer to replace the update data with the updated data stored after a designated arbitrary time point in accordance with the stored history information and discard the updated data stored after the designated arbitrary time point and the stored history information in response to a second instruction, to restore the initial status of the stored data at the designated arbitrary time point; and means for causing said computer to discard the stored updated data and the stored history information in response to a third instruction, to update the stored data.

* * * * *

UNITED STATES PATENT AND TRADEMARK OFFICE
CERTIFICATE OF CORRECTION

PATENT NO.    : 6,594,781 B1
DATED         : July 15, 2003
INVENTOR(S)   : Toshio Komasaka et al.

It is certified that error appears in the above-identified patent and that said Letters Patent is hereby corrected as shown below:

Column 22,
Line 26, delete "-".

Signed and Sealed this

Second Day of December, 2003

JAMES E. ROGAN
*Director of the United States Patent and Trademark Office*